United States Patent
Ciesla et al.

(10) Patent No.: US 9,116,617 B2
(45) Date of Patent: Aug. 25, 2015

(54) USER INTERFACE ENHANCEMENT SYSTEM

(75) Inventors: Craig Michael Ciesla, Mountain View, CA (US); Micah B Yairi, Palo Alto, CA (US); Nathaniel Mark Saal, Palo Alto, CA (US)

(73) Assignee: Tactus Technology, Inc., Fremont, CA (US)

( * ) Notice: Subject to any disclaimer, the term of this patent is extended or adjusted under 35 U.S.C. 154(b) by 0 days.

(21) Appl. No.: 13/465,772

(22) Filed: May 7, 2012

(65) Prior Publication Data

US 2012/0218214 A1     Aug. 30, 2012

Related U.S. Application Data

(63) Continuation of application No. 12/830,430, filed on Jul. 5, 2010, now Pat. No. 8,207,950.

(51) Int. Cl.
*G06F 3/041* (2006.01)
*G08B 6/00* (2006.01)
*G09B 21/00* (2006.01)
(Continued)

(52) U.S. Cl.
CPC .......... *G06F 3/04886* (2013.01); *G06F 1/1616* (2013.01); *G06F 1/1692* (2013.01); *G06F 3/016* (2013.01); *G06F 3/044* (2013.01); *G06F 3/0488* (2013.01); *G06F 2203/04809* (2013.01)

(58) Field of Classification Search
CPC ................. G06F 2203/04809; G06F 3/04895; G06F 3/016; G06F 3/044; G06F 3/04883; G06F 3/04886; G06F 3/0414; H01H 2215/046; G09B 21/003–21/004
USPC .................... 345/173–179; 178/18.01–20.04; 434/112–117
See application file for complete search history.

(56) References Cited

U.S. PATENT DOCUMENTS 3,034,628 A     5/1962   Wadey
3,659,354 A     5/1972   Sutherland
(Continued)

FOREIGN PATENT DOCUMENTS

CN     1260525 A     7/2000
CN     1530818 A     9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Kathy Wang-Hurst
*Assistant Examiner* — Jose Soto Lopez
(74) *Attorney, Agent, or Firm* — Jeffrey Schox

(57) ABSTRACT

A user interface enhancement system that includes a sheet that defines a surface and at least partially defines a fluid vessel arranged underneath the surface, a volume of fluid contained within the fluid vessel that cooperates with the sheet to transmit an image through the sheet without substantial obstruction, a displacement device that influences the volume of fluid within the fluid vessel to expand and retract at least a portion of the fluid vessel, thereby deforming a particular region of the surface, and an attachment component that couples the sheet to the device is disclosed.

17 Claims, 13 Drawing Sheets

(51) Int. Cl.
   *G06F 3/0488* (2013.01)
   *G06F 1/16* (2006.01)
   *G06F 3/01* (2006.01)
   *G06F 3/044* (2006.01)

(56) References Cited

U.S. PATENT DOCUMENTS

| | | | |
|---|---|---|---|
| 3,759,108 A * | 9/1973 | Borom et al. | 73/865.1 |
| 3,780,236 A | 12/1973 | Gross | |
| 3,818,487 A | 6/1974 | Brody et al. | |
| 4,109,118 A | 8/1978 | Kley | |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |
| 4,477,700 A | 10/1984 | Balash et al. | |
| 4,517,421 A | 5/1985 | Margolin | |
| 4,543,000 A | 9/1985 | Hasenbalg | |
| 4,584,625 A | 4/1986 | Kellogg | |
| 4,700,025 A * | 10/1987 | Hatayama et al. | 200/5 A |
| 4,772,205 A | 9/1988 | Chlumsky et al. | |
| 4,920,343 A | 4/1990 | Schwartz | |
| 4,940,734 A | 7/1990 | Ley et al. | |
| 5,194,852 A | 3/1993 | More et al. | |
| 5,195,659 A | 3/1993 | Eiskant | |
| 5,212,473 A | 5/1993 | Louis | |
| 5,222,895 A | 6/1993 | Fricke | |
| 5,286,199 A | 2/1994 | Kipke | |
| 5,369,228 A | 11/1994 | Faust | |
| 5,412,189 A | 5/1995 | Cragun | |
| 5,459,461 A | 10/1995 | Crowley et al. | |
| 5,488,204 A | 1/1996 | Mead et al. | |
| 5,496,174 A * | 3/1996 | Garner | 434/114 |
| 5,666,112 A | 9/1997 | Crowley et al. | |
| 5,717,423 A | 2/1998 | Parker | |
| 5,729,222 A | 3/1998 | Iggulden et al. | |
| 5,742,241 A | 4/1998 | Crowley et al. | |
| 5,754,023 A | 5/1998 | Roston et al. | |
| 5,766,013 A | 6/1998 | Vuyk | |
| 5,767,839 A | 6/1998 | Rosenberg | |
| 5,835,080 A | 11/1998 | Beeteson et al. | |
| 5,880,411 A | 3/1999 | Gillespie et al. | |
| 5,889,236 A | 3/1999 | Gillespie et al. | |
| 5,917,906 A | 6/1999 | Thornton | |
| 5,943,043 A | 8/1999 | Furuhata et al. | |
| 5,977,867 A | 11/1999 | Blouin | |
| 5,982,304 A | 11/1999 | Selker et al. | |
| 6,067,116 A * | 5/2000 | Yamano et al. | 348/372 |
| 6,154,198 A | 11/2000 | Rosenberg | |
| 6,154,201 A | 11/2000 | Levin et al. | |
| 6,160,540 A | 12/2000 | Fishkin et al. | |
| 6,169,540 B1 | 1/2001 | Rosenberg et al. | |
| 6,188,391 B1 | 2/2001 | Seely et al. | |
| 6,218,966 B1 | 4/2001 | Goodwin et al. | |
| 6,243,074 B1 | 6/2001 | Fishkin et al. | |
| 6,243,078 B1 | 6/2001 | Rosenberg | |
| 6,268,857 B1 | 7/2001 | Fishkin et al. | |
| 6,271,828 B1 | 8/2001 | Rosenberg et al. | |
| 6,278,441 B1 | 8/2001 | Gouzman et al. | |
| 6,300,937 B1 | 10/2001 | Rosenberg | |
| 6,310,614 B1 | 10/2001 | Maeda et al. | |
| 6,323,846 B1 | 11/2001 | Westerman et al. | |
| 6,337,678 B1 | 1/2002 | Fish | |
| 6,354,839 B1 * | 3/2002 | Schmidt et al. | 434/113 |
| 6,356,259 B1 | 3/2002 | Maeda et al. | |
| 6,359,572 B1 | 3/2002 | Vale | |
| 6,366,272 B1 | 4/2002 | Rosenberg et al. | |
| 6,369,803 B2 | 4/2002 | Brisebois et al. | |
| 6,384,743 B1 | 5/2002 | Vanderheiden | |
| 6,414,671 B1 | 7/2002 | Gillespie et al. | |
| 6,429,846 B2 | 8/2002 | Rosenberg et al. | |
| 6,437,771 B1 | 8/2002 | Rosenberg et al. | |
| 6,462,294 B2 | 10/2002 | Davidson et al. | |
| 6,469,692 B2 | 10/2002 | Rosenberg | |
| 6,486,872 B2 | 11/2002 | Rosenberg et al. | |
| 6,498,353 B2 | 12/2002 | Nagle et al. | |
| 6,501,462 B1 | 12/2002 | Garner | |
| 6,509,892 B1 | 1/2003 | Cooper et al. | |
| 6,529,183 B1 | 3/2003 | MacLean et al. | |
| 6,573,844 B1 | 6/2003 | Venolia et al. | |
| 6,636,202 B2 | 10/2003 | Ishmael, Jr. et al. | |
| 6,639,581 B1 | 10/2003 | Moore et al. | |
| 6,655,788 B1 | 12/2003 | Freeman | |
| 6,657,614 B1 | 12/2003 | Ito et al. | |
| 6,667,738 B2 | 12/2003 | Murphy | |
| 6,681,031 B2 | 1/2004 | Cohen et al. | |
| 6,686,911 B1 | 2/2004 | Levin et al. | |
| 6,697,086 B2 | 2/2004 | Rosenberg et al. | |
| 6,700,556 B2 | 3/2004 | Richley et al. | |
| 6,703,924 B2 | 3/2004 | Tecu et al. | |
| 6,743,021 B2 | 6/2004 | Prince et al. | |
| 6,788,295 B1 | 9/2004 | Inkster | |
| 6,819,316 B2 | 11/2004 | Schulz et al. | |
| 6,850,222 B1 | 2/2005 | Rosenberg | |
| 6,861,961 B2 * | 3/2005 | Sandbach et al. | 341/22 |
| 6,877,986 B2 | 4/2005 | Fournier et al. | |
| 6,881,063 B2 | 4/2005 | Yang | |
| 6,930,234 B2 | 8/2005 | Davis | |
| 6,937,225 B1 | 8/2005 | Kehlstadt et al. | |
| 6,975,305 B2 | 12/2005 | Yamashita | |
| 6,979,164 B2 | 12/2005 | Kramer | |
| 6,982,696 B1 | 1/2006 | Shahoian | |
| 6,995,745 B2 | 2/2006 | Boon et al. | |
| 7,027,032 B2 | 4/2006 | Rosenberg et al. | |
| 7,056,051 B2 | 6/2006 | Fiffie | |
| 7,061,467 B2 | 6/2006 | Rosenberg | |
| 7,064,655 B2 | 6/2006 | Murray et al. | |
| 7,081,888 B2 | 7/2006 | Cok et al. | |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,109,967 B2 | 9/2006 | Hioki et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,129,854 B2 | 10/2006 | Arneson et al. | |
| 7,131,073 B2 | 10/2006 | Rosenberg et al. | |
| 7,136,045 B2 | 11/2006 | Rosenberg et al. | |
| 7,138,977 B2 | 11/2006 | Kinerk et al. | |
| 7,138,985 B2 | 11/2006 | Nakajima | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,151,528 B2 | 12/2006 | Taylor et al. | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,276 B2 | 1/2007 | Face | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,195,170 B2 | 3/2007 | Matsumoto et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |
| 7,205,981 B2 | 4/2007 | Cunningham | |
| 7,208,671 B2 | 4/2007 | Chu | |
| 7,209,028 B2 | 4/2007 | Boronkay et al. | |
| 7,209,117 B2 | 4/2007 | Rosenberg et al. | |
| 7,209,118 B2 | 4/2007 | Shahoian et al. | |
| 7,210,160 B2 | 4/2007 | Anderson, Jr. et al. | |
| 7,215,326 B2 | 5/2007 | Rosenberg | |
| 7,216,671 B2 | 5/2007 | Unger et al. | |
| 7,218,310 B2 | 5/2007 | Tierling et al. | |
| 7,218,313 B2 | 5/2007 | Marcus et al. | |

(56) References Cited

U.S. PATENT DOCUMENTS

| | | |
|---|---|---|
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |

(56) References Cited

U.S. PATENT DOCUMENTS

| | | |
|---|---|---|
| 8,395,591 B2 | 3/2013 | Kruglick |
| 8,400,402 B2 | 3/2013 | Son |
| 8,400,410 B2 | 3/2013 | Taylor et al. |
| 8,749,489 B2 | 6/2014 | Ito et al. |
| 2001/0008396 A1 | 7/2001 | Komata |
| 2001/0043189 A1 | 11/2001 | Brisebois et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1* | 4/2005 | Durso .................... 345/173 |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0285846 A1 | 12/2005 | Funaki |
| 2006/0026521 A1 | 2/2006 | Hotelling et al. |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1* | 9/2006 | Chiu et al. .................... 345/173 |
| 2006/0238495 A1 | 10/2006 | Davis |
| 2006/0238510 A1 | 10/2006 | Panotopoulos et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1* | 5/2007 | Matsumoto et al. .......... 200/512 |
| 2007/0122314 A1 | 5/2007 | Strand et al. |
| 2007/0130212 A1 | 6/2007 | Peurach et al. |
| 2007/0152983 A1 | 7/2007 | McKillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1* | 1/2009 | Ullrich et al. .................. 345/173 |
| 2009/0002337 A1 | 1/2009 | Chang |
| 2009/0009480 A1 | 1/2009 | Heringslack |
| 2009/0015547 A1 | 1/2009 | Franz et al. |
| 2009/0033617 A1 | 2/2009 | Lindberg et al. |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1* | 5/2009 | Grant et al. .................... 345/173 |
| 2009/0129021 A1 | 5/2009 | Dunn |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0243998 A1 | 10/2009 | Wang |
| 2009/0250267 A1* | 10/2009 | Heubel et al. .............. 178/18.03 |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0073241 A1 | 3/2010 | Ayala et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0074691 A1 | 3/2011 | Causey et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |

(56) References Cited

U.S. PATENT DOCUMENTS

| | | |
|---|---|---|
| 2011/0181530 A1 | 7/2011 | Park et al. |
| 2011/0193787 A1 | 8/2011 | Morishige et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0098789 A1 | 4/2012 | Ciesla et al. |
| 2012/0105333 A1 | 5/2012 | Maschmeyer et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |

FOREIGN PATENT DOCUMENTS

| | | |
|---|---|---|
| CN | 1882460 A | 12/2006 |
| JP | 10255106 | 9/1998 |
| JP | 2006268068 A | 10/2006 |
| JP | 2006285785 A | 10/2006 |
| JP | 2009064357 A | 3/2009 |
| KR | 100677624 B | 1/2007 |
| WO | 2004028955 A | 4/2004 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Jeong et al., "Tunable Microdoublet Lens Array," Optical Society of America, Optics Express; vol. 12, No. 11. May 31, 2004, 7 pages.

Preumont, A. Vibration Control of Active Structures: An Introduction, Jul. 2011.

* cited by examiner

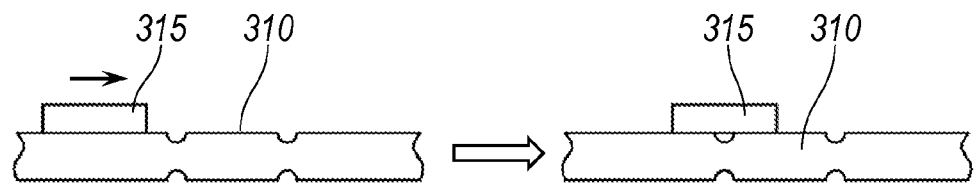
FIG. 19A  FIG. 19B
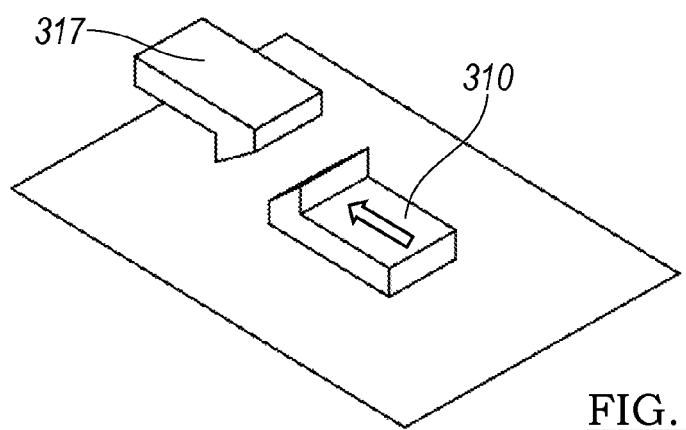
FIG. 20A
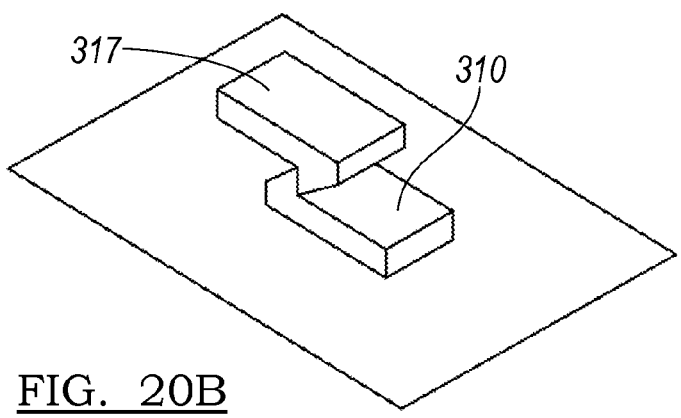
FIG. 20B

USER INTERFACE ENHANCEMENT SYSTEM

CROSS-REFERENCE TO RELATED APPLICATIONS

This application is a continuation of prior U.S. application Ser. No. 12/830,430, filed on 5 Jul. 2010, which is incorporated by reference.

This application is related to U.S. application Ser. No. 11/969,848, filed on 4 Jan. 2008, and U.S. application Ser. No. 12/319,334 filed on 5 Jan. 2009, both of which are incorporated by reference.

TECHNICAL FIELD

This invention relates generally to touch sensitive user interfaces, and more specifically to a new and useful mountable systems and methods for selectively raising portions of touch sensitive displays.

BACKGROUND

Touch sensitive displays, e.g., touch screens, are able to provide a dynamic user input interface and are useful in applications where the user interface is applied to a variety of uses, for example, in a universal remote control where the user interface may change to adapt to the device that is being controlled by the user or in a cellular phone with multiple functionalities. However, unlike a static user input interface with a dedicated input device, such as a keypad with discrete well-defined keys, most touch sensitive displays are generally flat. As a result, touch sensitive displays do not provide many of the tactile guidance that may be seen and/or felt in static user interfaces. The importance of tactile guidance is readily apparent in the competition between Apple's iPhone and RIM's Blackberry products. Without tactile guidance, several disadvantages exist; for example, the user may have difficulty distinguishing one input selection from another without keeping their eye on the display or have difficulty determining where to place their finger when entering an input. Many electronic devices such as smartphones, remote controls, personal navigation devices, cellular phones, and portable gaming devices are increasing in functionality, and it is becoming increasingly more difficult for manufacturers to provide a static user interface that can adapt to the various functions of each device. In an attempt to provide a better user experience, many electronic devices are increasingly using touch sensitive displays to provide a dynamic user interface that can adapt to the various functions of each device, thus there are a significant number of commonly available electronic devices that rely on a touch sensitive display as the main user input receiving device and lack the tactile guidance of a mechanical keypad. This invention provides a new and useful user interface that may be appended to such a device to provide tactile guidance.

BRIEF DESCRIPTION OF THE FIGURES

FIGS. 19a, 19b, 20a, and 20b, are schematic views of the locking mechanism of a first and second example in the disengaged and engaged states, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1A:
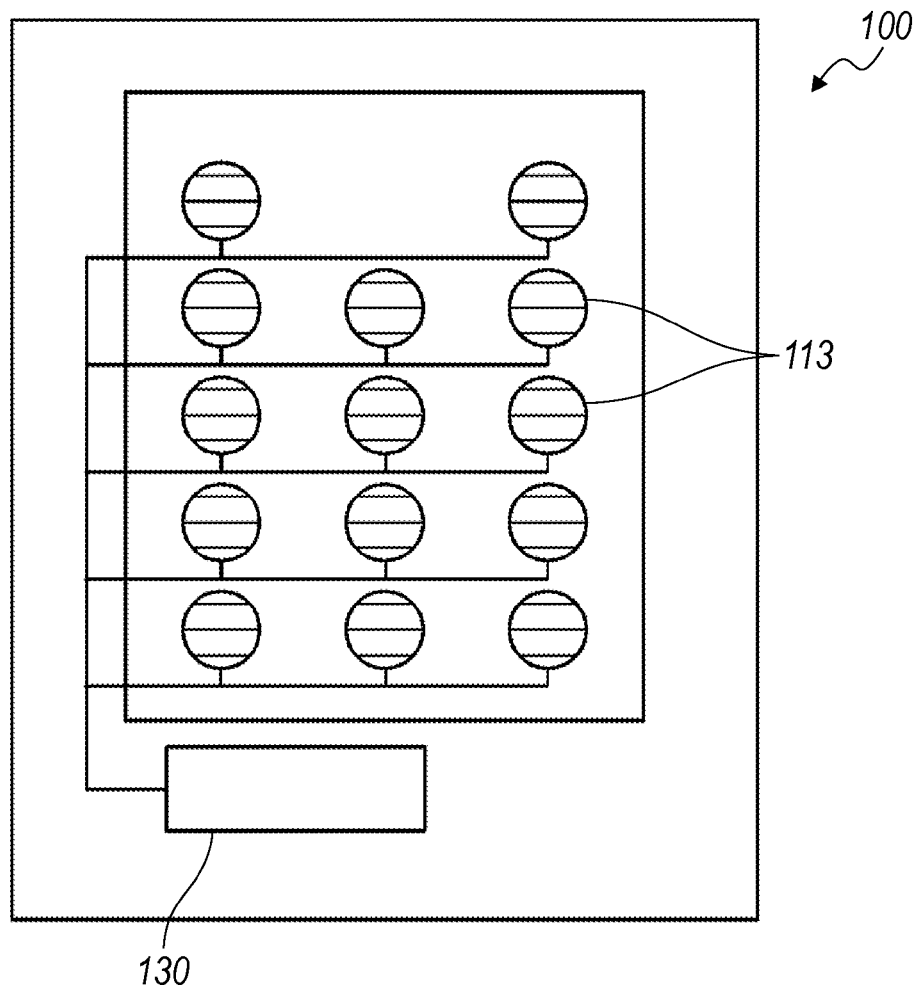
FIGS. 1a and 1b are a top view of the user interface system of the preferred embodiments and a cross-sectional view illustrating the operation of a button array in accordance to the preferred embodiments, respectively.
Figure 1B:
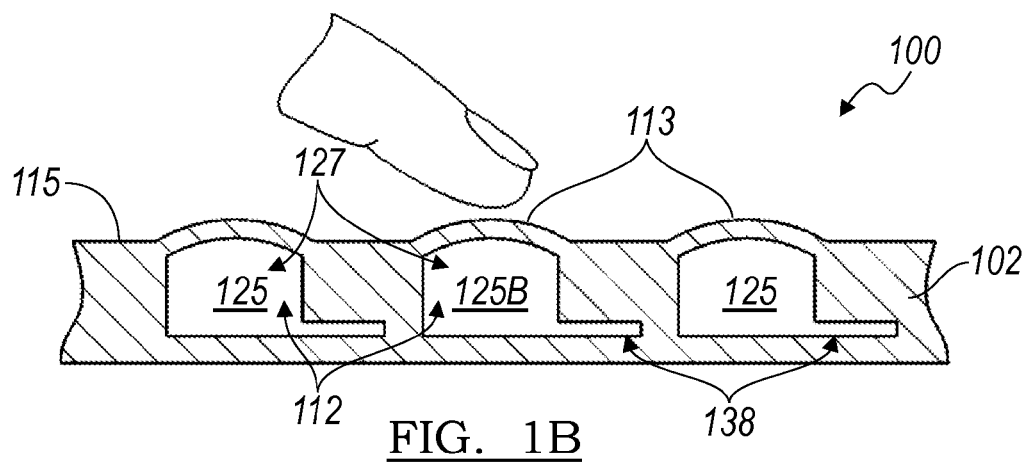
Figure 2A:
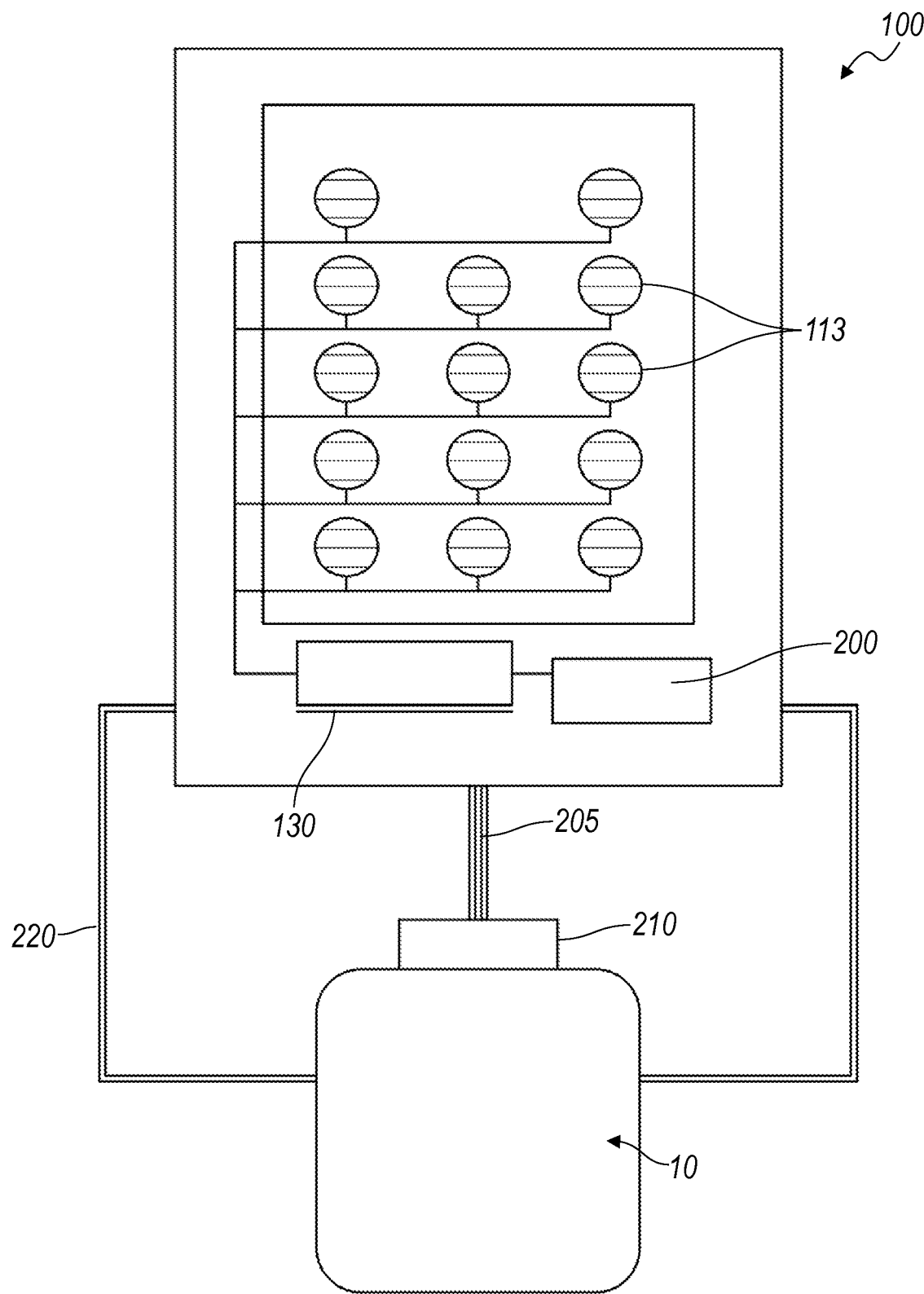
FIGS. 2a and 2b are schematic views of the user interface system of the preferred embodiments coupled to a device.
Figure 4A:
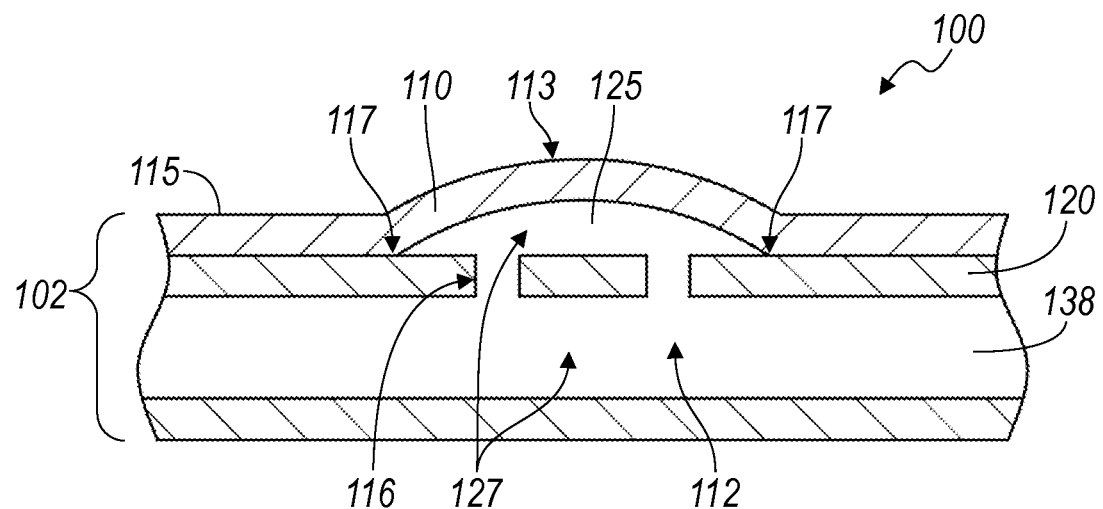
FIGS. 4a and 4b are cross-sectional views of a second variation of the sheet with a combination of a channel and a cavity and a third variation of the sheet with a split layer portion and a substrate portion.

As shown in FIGS. 1 and 2, the user interface enhancement system 100 of the preferred embodiments is preferably used to enhance the user interface of a touch interface device 10, as shown in FIG. 2. The user interface enhancement system 100 of the preferred embodiments preferably includes a sheet 102 that defines a surface 115 and at least partially defines a fluid vessel 127; a volume of fluid 112 contained within the fluid vessel 127 that cooperates with the sheet 102 to transmit an image through the sheet 102 without substantial obstruction; a displacement device 130 that influences the volume of fluid 112 within the fluid vessel 127 to expand and retract at least a portion of the fluid vessel 127, thereby deforming a particular region 113 of the surface 115; and an attachment component 220 that couples the sheet to the device 10. As shown in FIGS. 1b and 2, the fluid vessel 127 is preferably a cavity 125 and the displacement device 130 preferably influences the volume of fluid within the cavity 125 to expand and retract the cavity 125. The fluid vessel 127 may alternatively be a channel 138 or a combination of a channel 138 and a cavity 125, as shown in FIG. 4a. The user interface enhancement system 100 is preferably one of two preferred embodiments. In a first preferred embodiment, the displacement device 130 is electrically powered. In a second preferred embodiment, the displacement device 130 is manually powered. As shown in FIG. 2, the user interface enhancement system 100 of the preferred embodiments may also include a native power source 200 that preferably functions to power the user interface enhancement system 100, a data-link 205 that functions to allow the user interface enhancement system 100 and the device 10 to communicate, and/or a connector 210 that functions to electrically couple the user interface enhancement system 100 to the device 10. The displacement device 130 and/or the native power source 200 may also be contained within the sheet 102, but may alternatively be exterior to the sheet 102. The fluid vessel 127 may also include a second cavity 125b that contains a volume of fluid 112 and the displacement device 130 preferably also influences the volume of the fluid within the second cavity 125b to expand and retract the second cavity 125b, thereby deforming a second particular region 113 of the surface 115. The displacement device 130 preferably influences the volume of fluid 112 within the second cavity 125b independently of the cavity 125, but may alternatively influence the volumes of fluid 112 within both cavity and second cavity 125 and 125b substantially concurrently. Alternatively, the user interface enhancement system 100 may include a second displacement device 130 that functions to influence the volume of fluid 112 within the second cavity 125b to expand and retract the second cavity 125b, thereby deforming a second particular region 113 of the surface. The second cavity 125b is preferably similar or identical to the cavity 125, but may alternatively be any other suitable type of cavity.

Figure 3A:
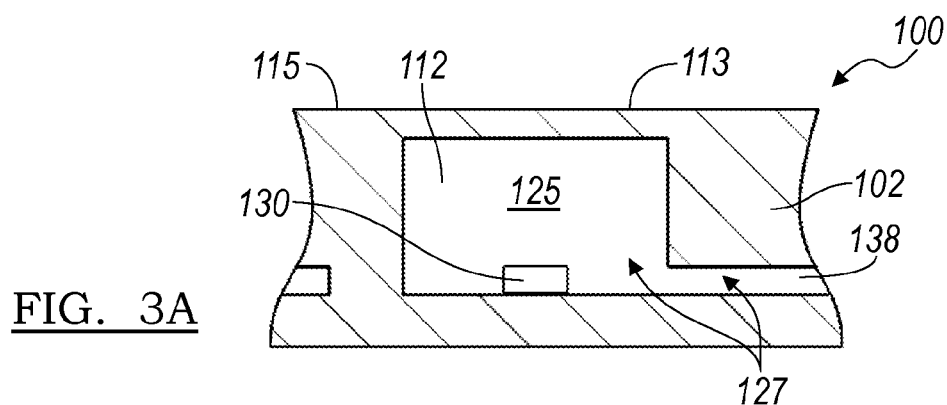
FIGS. 3a, 3b, and 3c are cross-sectional views of the retracted, expanded, and user input modes of the preferred embodiments, respectively.
Figure 3B:
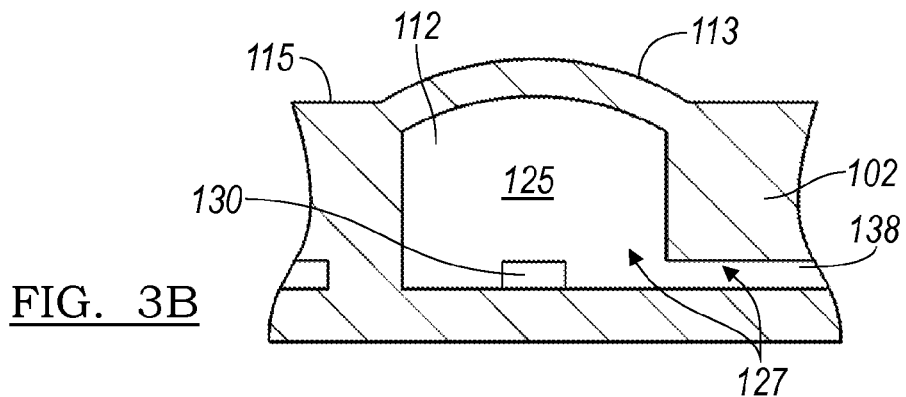
Figure 3C:
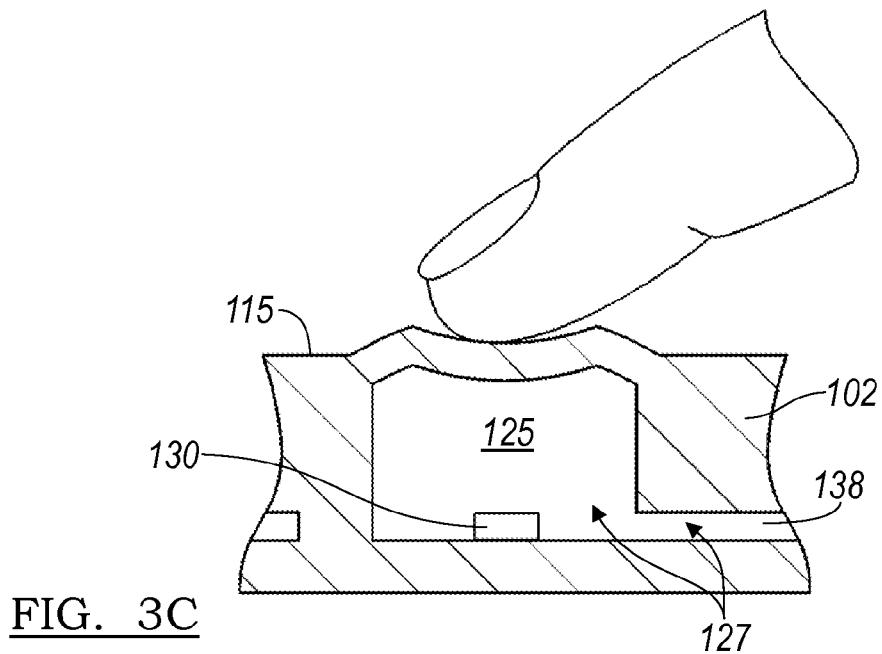

The user interface enhancement system 100 of the preferred embodiments has been specifically designed to be appended to the user interface of an electronic device 10, more preferably in an electronic device 10 that utilizes a touch sensitive display as the main means to receive user input. This may include, for example, a laptop computer, a tablet computer, a mobile phone, a PDA, a personal navigation device, a remote control, a personal media player, a camera, a trackpad, or a keyboard. The user interface enhancement system 100 may, however, be used as the user interface for any suitable device that interfaces with a user in a tactile and/or visual manner (such as an automotive console, a desktop computer, a television, a radio, a desk phone, a watch, a remote, and a mouse). As shown in FIG. 3, the surface 115 of the user interface enhancement system 100 preferably remains flat until tactile guidance is to be given to the user in the location of the particular region 113. The displacement device 130 then preferably expands the cavity 125 to deform the particular region 113 outward, forming a deformation that may be felt by a user, and providing tactile guidance for the user. The expanded particular region 113 preferably also provides tactile feedback to the user when he or she applies force onto the particular region 113 to provide input. Tactile feedback may be in the form of Newton's third law, where an applied force has an equal and opposite reaction force, but may alternatively be any other suitable type of tactile feedback. Alternatively, the displacement device 130 may retract the cavity 135 to deform the particular region 113 inward. However, any other suitable deformation of the particular region 113 may be used. The user input is preferably detected by the touch sensitive display and processed by the device 10. However, any other suitable arrangement of the user interface enhancement system 100 may be used.

Figure 2B:
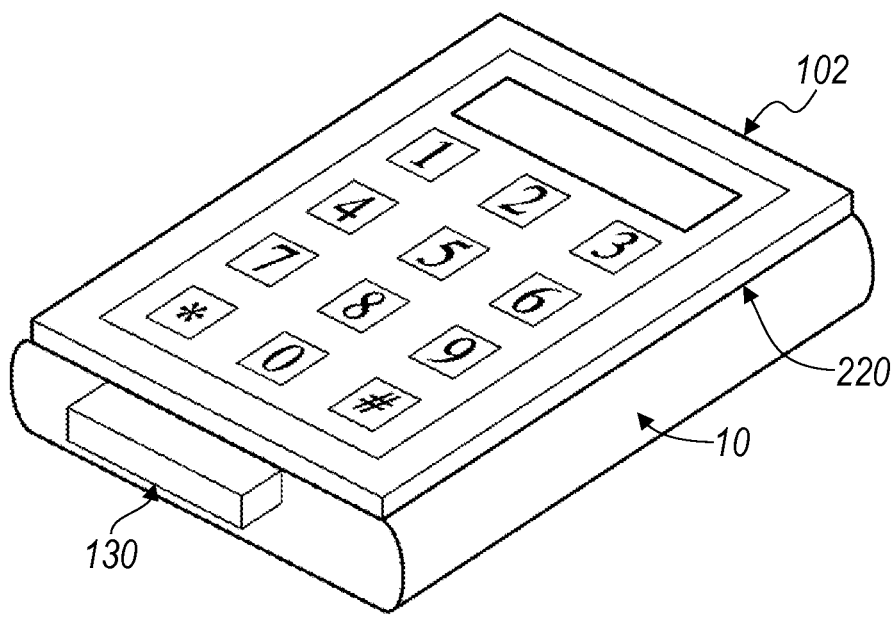

As shown in FIG. 2b, the user interface system 100 is preferably placed over a touch sensitive display of a device 10 that displays an image. As described above, the volume of fluid 112 preferably cooperates with the sheet 102 to transmit an image through the sheet 102 without substantial obstruction. Alternatively, the volume of fluid 112 may cooperate with the sheet 102 to transmit an image through the sheet 102 without substantial obstruction only when the fluid vessel 127 is in a particular state, for example, when the fluid vessel 127 is in the retracted state or when the fluid vessel is in the expanded state. Because the deformation of the particular region 113 functions to provide tactile guidance to the user, the user may not need the visual cues from the image to operate the user interface when tactile guidance is present. However, the volume of fluid 112 and the sheet 102 may cooperate to transmit an image through the sheet 102 without substantial obstruction in any other suitable arrangement. Obstruction to image transmission may be defined as any manipulation of the image that provides a visual interruption of the image in reaching the user. Obstruction may include blocking a substantial portion of the image, substantially dimming the image, and/or substantially distorting the image unintelligibly. Manipulations to an image that are preferably not considered obstruction to image transmission may include distortion of the image while allowing the image to be substantially visually intelligible, substantially uniformly tinting the image, and/or substantially uniformly enlarging the image. In a first variation, to decrease distortion of the image, the volume of fluid 112 and the sheet 102 preferably cooperate to allow the light from the display to reach the user's eyes at substantially the same angle from the sheet 102 as directly from the display such an image from the display is seen through the sheet 102 as it would be seen directly from the display. In a second variation, the volume of fluid 112 and sheet 102 may function to substantially uniformly refract light from the display to maintain substantially the same relative proportions between different regions of the image as seen by the user. For example, the volume of fluid 112 and the sheet 102 may cooperatively function to substantially magnify the image from the display of the device 10 thus increasing the size of the image as seen by the user uniformly or increasing the size of one portion of the image more than another portion. In a third variation, the volume of fluid 112 and sheet 102 may cooperate to refract light from different portions of the image differently (i.e., "warp" the image) to increase the magnification of certain portions of the image. For example, the fluid 112 and the sheet 102 may cooperate to provide a fish-eye type magnification to the image to substantially increase visibility of certain portions of the image. In the first, second, and third variations, the volume of fluid 112 and sheet 102 are preferably each of substantially the same index of refraction to maintain substantially one refraction angle of the light from the display as the light transmits through the sheet 102. Alternatively, the index of refraction of the volume of fluid 112 and the sheet 102 may be substantially different but the fluid 112 and sheet 102 preferably cooperate to decrease detection of the different refraction angles by the user. For example, the volume of fluid 112 may occupy a substantially small percentage of the thickness and/or width of the sheet 102 such that the change in refraction angle in the fluid 112 is substantially undetectable by the user. In a second example, the walls of the channel 138 and/or cavity 125 may be arranged to compensate for differences in the index of refraction between the fluid 112 and the sheet 102, for example, by positioning the walls at a particular angle relative to the sheet 102. Both the sheet 102 and the fluid 112 are preferably substantially transparent to decrease changes in the color and/or intensity of the image. Similarly, the sheet 102 and fluid 112 preferably both include substantially similar light absorptive properties, birefringence properties, and/or chromaticity properties. However, any other suitable translucency, transparency level, absorptive, refraction, and/or any other suitable light transmission properties may be used for the sheet 102 and fluid 112. Similarly, any other suitable method may be used to decrease obstruction to the transmission of an image.

The shape of the deformation of the particular region 113 is preferably one that is felt by a user through their finger and preferably acts as (1) a button that can be pressed by the user, (2) a slider that can be pressed by the user in one location along the slider or that can be swept in a sliding motion along the slider (such as the "click wheel" of the second generation Apple iPod), and/or (3) a pointing stick that can be pressed by the user from multiple directions and/or locations along the surface whereby the user is provided with tactile feedback that distinguishes a first directional touch from a second directional touch and/or a touch in a first location from a touch in a second location (such as the pointing stick trademarked by IBM as the TRACKPOINT and by Synaptics as the TOUCHSTYK (which are both informally known as the "nipple")). The deformation may, however, act as any other suitable device or method that provides suitable tactile guidance and feedback.

As shown in FIGS. 1 and 3, the sheet 102 of the preferred embodiment functions to provide a surface 115 that interfaces with a user in a tactile manner and to at least partially define a fluid vessel 127. As described above, the fluid vessel 127 is preferably a cavity 125 (as shown in FIGS. 1b and 2), but may alternatively be a channel 138 or a combination of a cavity 125 and a channel 138 (as shown in FIG. 4a). The surface 115 is preferably continuous, such that when swiping a finger across the surface 115 a user would not feel any seams or any other type of break in the surface 115. Alternatively, the surface 115 may include features that facilitate the user in distinguishing one region from another. The surface 115 is also preferably planar. The surface 115 is preferably arranged in a flat plane, but may alternatively be arranged in a curved plane or on a first plane and then wrapped around to a second plane substantially perpendicular to the first plane, or any other suitable arrangement. The surface 115 may alternatively include lumps, bumps, depressions, textures, or may be a surface of any other suitable type or geometry. The surface 115 also functions to deform upon an expansion of the cavity 125, and to preferably "relax" or "un-deform" back to a normal planar state upon retraction of the cavity 125. In a first version, the sheet 102 contains a first portion that is elastic and a second portion that is relatively inelastic. In a second version, sheet 102 is relatively more elastic in a first portion and relatively less elastic in a second portion and is deformed by the expanded cavity 125 in the relatively more elastic portion. In the first and second version, the first portion and the second portion may be located across the length and width of the sheet 102. Alternatively, the first portion and the second portion may be located along the thickness of the sheet 102. In a third version, the sheet 102 is generally uniformly elastic. In fourth version, the sheet 102 includes or is made of a smart material, such as Nickel Titanium (commonly referred to as "Nitinol"), that has a selective and/or variable elasticity. As described above, the sheet 102 is preferably optically transparent, but may alternatively be translucent. In addition to the transparency, the sheet 102 preferably has the following properties: a high transmission, a low haze, a wide viewing angle, scratch resistant, chemical resistant, stain resistant, resistant to debris retention, easy to clean, resistant to puncture and permeation, and relatively smooth (not tacky) to the touch. Because the user interface enhancement system 100 of the preferred embodiments is preferably appended to the screen of an electronic device 10, the sheet 102 also preferably has a minimal amount of back reflectance upon the display of the electronic device 10. The sheet 102 preferably also provides minimal or low glare in ambient and/or daylight conditions. The sheet 102 may also be adhered to the display and/or touch sensor of the electronic device 10 to decrease reflection and/or refraction of light emitting from the display. However, any other suitable arrangement of the sheet 102 may be used. The sheet 102 is preferably made from a suitable elastic material, including polymers and silicone-based and urethane elastomers such as poly-dimethylsiloxane (PDMS) or RTV Silicone (e.g., Momentive RTV Silicone 615). The sheet 102 may also include coatings to provide properties such as smoothness (for example, low coefficient of friction), hydrophobic and oleophobic characteristics, scratch resistance, and/or resistance to debris retention. The sheet 102 may also include coatings to provide desired optical properties, such as antireflection and anti-glare. Coatings may be applied on the surface 115, but may alternatively be applied on any other suitable surface of the sheet 102. In the version wherein the sheet 102 includes a first portion that is elastic and a second portion that is relatively inelastic, the inelastic portion is preferably made from a material including polymers or glass, for example, elastomers, silicone-based organic polymers such as poly-dimethylsiloxane (PDMS), thermoset plastics such as polymethyl methacrylate (PMMA), and photocurable solvent resistant elastomers such as perfluropolyethers. The sheet 102 may, however, be made of any suitable material that provides the surface 115 that deforms and defines a cavity 125.

Figure 4B:
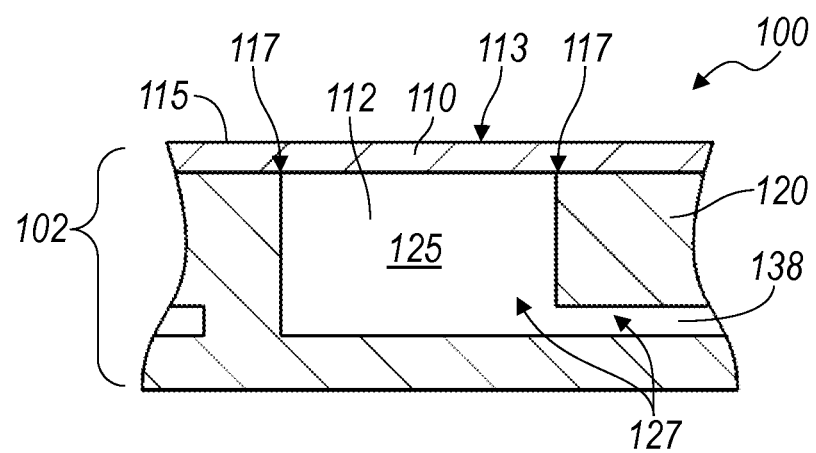

The sheet 102 may be manufactured using well-known techniques for micro-fluid arrays to create one or more cavities and/or micro channels. The sheet 102 may be constructed using multiple layers from the same material or from different suitable materials, for example, the sheet 102 may include a layer portion 110 of one material that defines the surface 115 and a substrate portion 120 of a second material (as shown in FIGS. 4a and 4b). As shown in FIG. 4a, the substrate portion 120 preferably defines a fluid outlet 116 that allows fluid to flow between the channel 138 and the cavity 125 to deform and un-deform a particular region of the surface 113. The fluid outlet 116 may be formed into the substrate portion 120, for example, the fluid outlet 116 may be a series of bores that are machined into the substrate in between the channel 138 and the cavity 125 as shown in FIG. 4b or an open orifice between the cavity 125 and the channel 138 as shown in FIG. 4a, but may alternatively be a property of the material, for example, the substrate portion 120 may include a porous material that includes a series of interconnected cavities that allow fluid to flow through the substrate portion 120. The substrate portion 120 may define any suitable number of fluid outlets 116 that are of any suitable size and shape. The substrate portion 120 may also include a fluid outlet layer (not shown) that defines the fluid outlets 116 that is separate from substrate portion 120 and arranged in between the substrate portion 120 and layer portion 110. However, any other suitable arrangement of the fluid outlets 116 may be used. As shown in FIG. 4b, the portion of the substrate portion 120 (or fluid outlet layer) that includes the fluid outlets 116 may also function to provide a support for the layer portion 110 to substantially prevent the layer portion no from substantially depressing into the channel 138 when force is applied over the particular region 113. However, the substrate portion 120 may be arranged in any other suitable manner and may provide support for the layer portion 110 in any other suitable way.

The layer portion 110 is preferably attached to the substrate portion 120 (or fluid outlet layer) at an attachment point 117 that at least partially defines the size and/or shape of the particular region 113. In other words, the attachment point 117 functions to define a border between a deformable particular region of the surface 113 and the rest of the surface 115 and the size of the particular region 113 is substantially independent of the size of the cavity 124 and/or the channel 138. The attachment point 117 may be a series of continuous points that define an edge, but may alternatively be a series of non-continuous points. The attachment point 117 may be formed using, for example, adhesive, chemical bonding, surface activation, welding, or any other suitable attachment material and/or method. The method and material used to form the attachment point 117 is preferably of a similar optical property as the layer portion 110 and the substrate portion 120, but may alternatively be of any other optical property. Other portions of the layer portion 110 and substrate portion 120 not corresponding to a particular region of the surface 113 may also be adhered using similar or identical materials and methods to the attachment point 117. Alternatively, the layer portion 110 and substrate portion 120 may be left unattached in other portions not corresponding to a particular region of the surface 113. However, the sheet 102 may be arranged in any other suitable manner.

As shown in FIG. 2, the layer 110 of the preferred embodiment functions to provide the surface 115 that interfaces with a user in a tactile manner. The surface 115 is preferably continuous, such that when swiping a finger across the surface 115 a user would not feel any interruptions or seams. The surface 115 is also preferably planar. The surface 115 is preferably arranged in a flat plane, but may alternatively be arranged in a curved plane. The layer 110 also functions to deform upon an expansion of the cavity 125, and to preferably "relaxes" or "un-deforms" back to a normal planar state upon retraction of the cavity 125. The layer 110 is preferably elastic. In one version, the layer 110 is relatively more elastic in specific areas and relatively less elastic in other areas and is deformed in the relatively more elastic areas. In another version, the layer 110 is generally uniformly elastic. In yet another version, the layer 110 includes or is made of a smart material, such as Nickel Titanium (commonly referred to as "Nitinol"), that has a selective and/or variable elasticity. The layer 110 is preferably optically transparent, but may alternatively be translucent or opaque. In addition to the transparency, the layer 110 preferably has the following properties: a high transmission, a low haze, a wide viewing angle, a minimal amount of back reflectance upon the display 150 (if the display 150 is coupled with the user interface), scratch resistant, chemical resistant, stain resistant, and relatively smooth (not tacky) to the touch. The layer 110 is preferably made from a suitable elastic material, including polymers and silicon-based elastomers such as poly-dimethylsiloxane (PDMS) or RTV Silicon (e.g., RTV Silicon 615). The layer 110 may, however, be made of any suitable material that provides the surface 115 and that deforms. In one version, the layer 110 is a single homogeneous layer less than 1 mm thick (preferably 50 to 200 microns). In another version, the layer 110 may be constructed using multiple layers or coatings from the same material or from different suitable materials.

Figure 5:
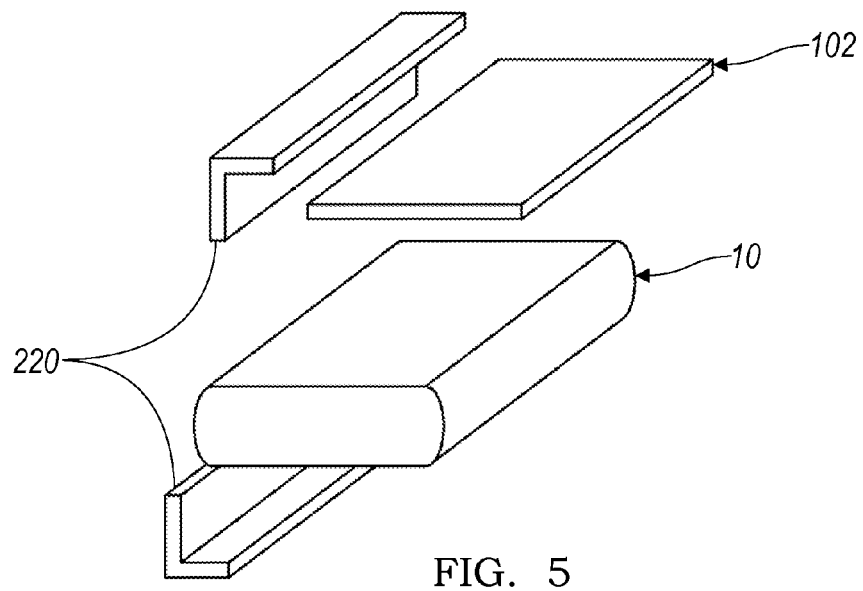
FIGS. 5 and 6 are schematic views of variations of the attachment component of the preferred embodiments.
Figure 6A:
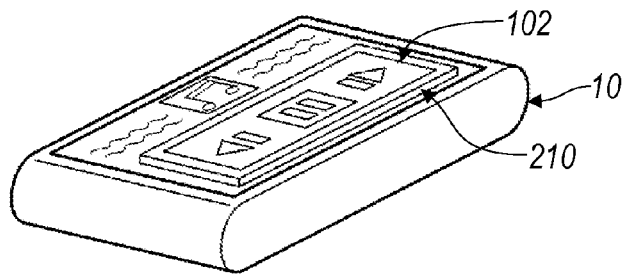
Figure 6B:
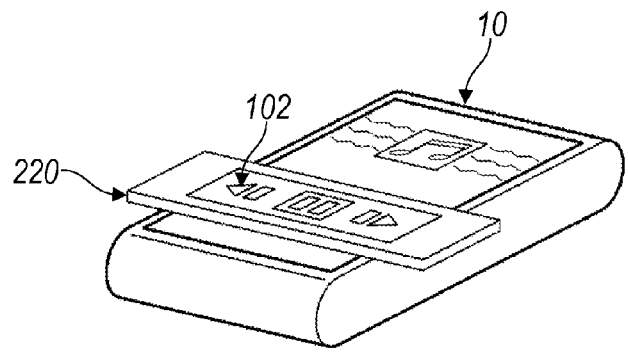

The substrate 120 of the preferred embodiments functions to support the layer 110 and to at least partially define the cavity 125. In one version, as shown in FIG. 3a and 3b, the layer 110 is directly attached to the substrate 120 using an adhesive, ultra-sonic bonding, oxygen plasma surface treatment, or any other suitable techniques known to one skilled in the art. The substrate 120 and the layer 110, in this version, cooperately define the cavity 125 (with the substrate 120 defining a "container" and the layer 110 defining a "membrane" over the "container"). In another version, as shown in FIGS. 4a and 4b, the layer 110 is indirectly attached to the substrate 120 with another element, such as the touch sensor 140 and/or the display 150 located between the layer 110 and the substrate 120. The substrate 120 and the intervening element define the cavity 125 in this version. In yet another version, as shown in FIGS. 5a and 5b, the layer 110 and the substrate 120 are formed as a singular structure, which fully defines the cavity 125. In yet one more version, as shown in FIGS. 6a and 6b, the substrate 120 may include a lattice-like support member 160 under the particular region of the surface 115. When the cavity 125 is expanded and the deformation is present in the surface 115, the support member 160 functions to prevent a user from "pressing too far" into the deformation below the plane of the surface 115. When the cavity 125 is not expanded and the deformation is not present in the surface 115, the support member 160 functions to reduce (or potentially eliminate) the user from feeling "divots" in the surface 115 when swiping a finger across the surface 115. As shown in FIG. 6c, the support member 160 preferably includes holes or channels that allow for the expansion of the cavity 125 and the deformation of the surface 115. The support member 160 is preferably integrally formed with the substrate 120, but may alternatively be formed with the layer 110 or may be separately formed and later attached to the substrate 120. Finally, as shown in FIG. 6d, the support member 160 may alternatively partially define the cavity 125. The substrate 120 is preferably rigid, but may alternatively be flexible in one or more directions. The substrate 120—if located above the display 150—is preferably optically transparent, but may—if located below the display 150 or if bundled without a display 150—be translucent or opaque. The substrate 120 is preferably made from a material including polymers or glass, for example, elastomers, silicon-based organic polymers such as poly-dimethylsiloxane (PDMS), thermoset plastics such as polymethyl methacrylate (PMMA), and photocurable solvent resistant elastomers such as perfluropolyethers. The substrate 120 may, however, be made of any suitable material that supports the layer 110 and at least partially defines the cavity 125. In the preferred version, the substrate 120 is a single homogenous layer approximately 1 mm to 0.1 mm thick and can be manufactured using well-known techniques for microfluid arrays to create one or more cavities and/or micro channels. In alternative versions, the substrate 120 may be constructed using multiple layers from the same material or from different suitable materials.

The fluid vessel 127 of the preferred embodiment functions to hold a volume of fluid 112 and to have at least two volumetric settings: a retracted volume setting (as shown in FIG. 3a for the variation of the fluid vessel 127 that includes a cavity 125) and an expanded volume setting (shown in FIG. 3b for the variation of the fluid vessel 127 that includes a cavity 125). The fluid 112 is preferably a substantially incompressible fluid, but may alternatively be a compressible fluid. The fluid 112 is preferably a liquid (such as water, glycerin, oil, or ethylene glycol), but may alternatively be a gas (such as air, nitrogen, or argon) or any other substance (such as a gel or aerogel) that expands the cavity 125 and deforms the surface 115. In the expanded volume setting, the cavity 125 deforms the particular region 113 of the surface 115 above the plane of the other regions of the surface 115. When used with an electronic device 10 that is a mobile phone, the cavity 125 preferably has a diameter of 2-10 mm. When used with this or other applications, however, the cavity 125 may have any suitable dimension.

As shown in FIG. 2, the attachment component 220 of the preferred embodiments preferably functions to mount the user interface enhancement system 100 to the device 10. The attachment component 220 preferably maintains the relative position between the user interface enhancement system 100 and the device 10 such that the location of the particular region 113 is positioned substantially over, near, or adjacent to the area on the touch sensitive display where tactile guidance is to be provided. The attachment component 220 is preferably a semi-permanent attachment mechanism such an adhesive that is placed on a surface of the sheet 102 that is to be placed substantially in direct contact with the touch sensitive display of the device 10. Alternatively, a gap may be present in between the touch sensitive display of the device and the sheet 102. The adhesive may be double sided tape that is preferably clear to allow transparency of the user interface enhancement system 100. The double sided tape may be placed along the entire contact surface, but may alternatively be along a portion of the contact surface. Examples of double sided tape include 3M VHB tapes and 3M Optically Clear Adhesive (OCA). Alternatively, the adhesive may be a liquid adhesive such as an epoxy that is preferably transparent. The index of refraction of the liquid adhesive is preferably chosen with respect to the index of refraction of the user interface enhancement system 100 and the index of refraction of the device to decrease visibility of multiple layers. However, any other suitable type of adhesive may be used. The adhesive may also be placed to envelop both a portion of the user interface enhancement system 100 and a portion of the device 10. The attachment component 220 may alternatively be a relatively non-permanent attachment mechanism such as a clamp that may be actuated by the user, as shown in FIG. 5. The clamp variation of the attachment component 220 may be a case that encases all or a large portion of the device 10 and positions the user interface enhancement system 100 over the display of the device 10, additionally functioning as a protective element for the device 10 and/or a structure to keep components of the user interface enhancement system 100 hidden from the user (for example, the native power source 200), but may alternatively encase a small portion of the device 10. The attachment component may alternatively be a combination of the variations above, for example, sheet 102 may be semi-permanently adhered to a clamp, which is then relatively non-permanently coupled to the device 10. However, any other suitable type of attachment system, material, or method may be used to couple the user interface enhancement system 100 to the device 10 semi-permanently or relatively non-permanently. The attachment component 220 preferably functions to provide one position setting (for example, in the variations of the attachment component 220 that adhere the sheet 102 to the device 10), but may include more than one position setting, as shown in FIGS. 6a and 6b (for example, in the non-permanent or combination permanent and non-permanent variations of the attachment component 220). In this variation, the user preferably sets the desired setting. The setting may be selected by the user or instructed by the device 10 to the user to apply (for example, in a device that includes a keyboard feature with a landscape and portrait mode, when there is a transition between the landscape and portrait mode, the device 10 may instruct the user to transition the position setting. Alternatively, the attachment component 220 may include an active position adjuster such as a servomotor or a linear actuator or any other suitable motion-inducing element that applies the selected position setting. For example, in one mode of functionality, the user interface enhancement system 100 may be oriented in one position relative to the device 10 and in a second mode of functionality; the user interface enhancement system 100 may be oriented in a second position relative to the device 10. However, any suitable arrangement of the attachment component 220 may be used.

As described above, the user interface enhancement system 100 is preferably one of two preferred embodiments: a first preferred embodiment where the displacement device 130 is electrically powered and a second preferred embodiment where the displacement device 130 is manually powered. In both preferred embodiments, the displacement device 130 functions to influence the volume of fluid 112 within fluid vessel 127 to expand and retract at least a portion of the fluid vessel 127, thereby deforming a particular region 113 (and/or a second particular region 113) of the surface 115. When used with a mobile phone device 10, for the variation of the fluid vessel 127 that includes a cavity 125, the displacement device 130 preferably increases the volume of the fluid 112 within the fluid vessel 127 by approximately 0.003-0.5 ml to expand the cavity 125 to outwardly deform a particular region 113 but may alternatively increase the volume of fluid 112 by any other suitable amount. When used with this or other applications, however, the volume of the fluid may be increased (or possibly decreased) by any suitable amount. Although the cause of the deformation of a particular region 113 of the surface 115 has been described as a modification of the volume of the fluid in the fluid vessel 127, it is possible to describe the cause of the deformation as an increase or decrease in the pressure below the surface 115 relative to the pressure above the surface 115. When used with a mobile phone device 10, an increase of approximately 0.1-10.0 psi between the pressure below the surface 115 relative to the pressure above the surface 115, is preferably enough to outwardly deform a particular region 113 of the surface 115. When used with this or other applications, however, the modification of the pressure may be increased (or possibly decreased) by any suitable amount.

1. First Preferred Embodiment

Electrically Powered

The displacement device 130 of the first preferred embodiment is preferably electrically powered and modifies the volume of the fluid 112 by (1) modifying the volume of the existing fluid in the fluid vessel 127, or (2) displacing fluid to and from the fluid vessel 127. The displacement device 130 may, however, influence the volume of the fluid 112 by any suitable electrically powered device or method. Modifying the volume of the existing fluid in the fluid vessel 127 (or cavity 125 and/or channel 138) most likely has an advantage of lesser complexity, while displacing fluid to and from the fluid vessel 127 (or cavity 125 and/or channel 138) most likely has an advantage of maintaining the deformation of the surface 115 without the need for additional energy (if valves or other lockable mechanisms are used). The following examples are described as expanding a fluid vessel 127 that includes a cavity 125 and a channel 138, but the fluid vessel 127 may be any other suitable combination of combination of cavity 125 and channel 138.

Figure 7A:
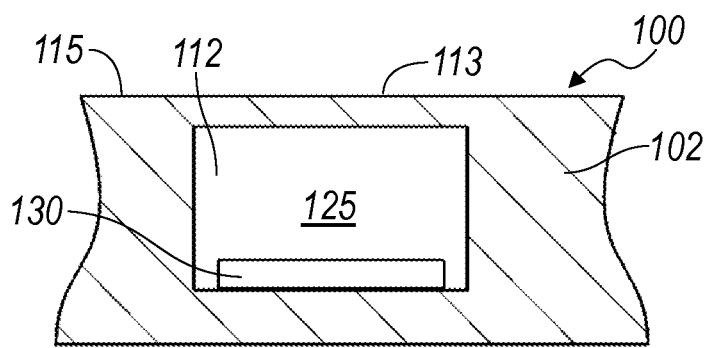
FIGS. 7a and 7b are cross-sectional views of the sheet, the cavity, and a displacement device of the first preferred embodiment that modifies the existing fluid in the cavity, with the cavity in a retracted volume setting and an expanded volume setting, respectively.
Figure 7B:
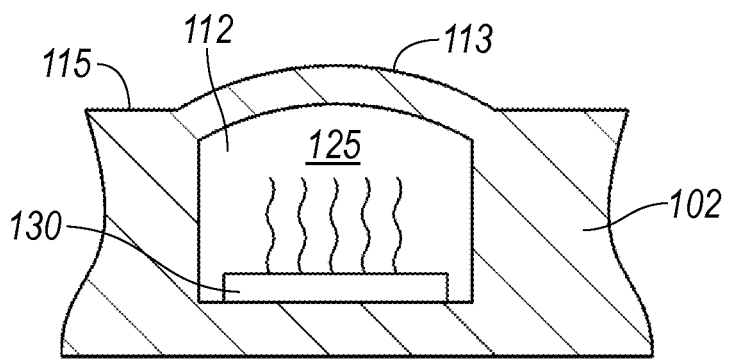

Modifying the existing fluid in the cavity 125 may be accomplished in several ways. In a first example, as shown in FIGS. 7a and 7b, the fluid may be an expandable fluid such as gas and the displacement device 130 may include a heating element that heats the expandable fluid, thereby expanding the volume of the existing fluid in the cavity 125 (for example, according to the ideal gas law, PV=nRT). The heating element, which may be located within or adjacent the cavity 125, or any other suitable location within the fluid vessel 127, is preferably a resistive heater. The resistive heater preferably also allows for the transmission of an image, but may alternatively be located in a location that does not cause obstruction of transmission of an image. For example, the resistive heater may be made of a material such as TaN or Nichrome. In a second example, the fluid may include an expandable substance, such as plastic expandable microspheres. In a third example, the fluid may include paraffin. In a fourth example, the fluid may be a substance that increases volume with an applied electrical current and/or electric field or voltage. In a fifth example, the fluid may include particles that influence the volume of fluid 112, for example, electrically attractable or repulsive particles such as charged plastic or glass microspheres that, when a current is applied to the fluid 112, function to affect the volume of the fluid 112. While these are five examples, the displacement device 130 can be any other suitable device 10 or method that ultimately expands the cavity 125 from the retracted volume setting to the expanded volume setting by modifying the existing fluid in the cavity 125.

Figure 8:
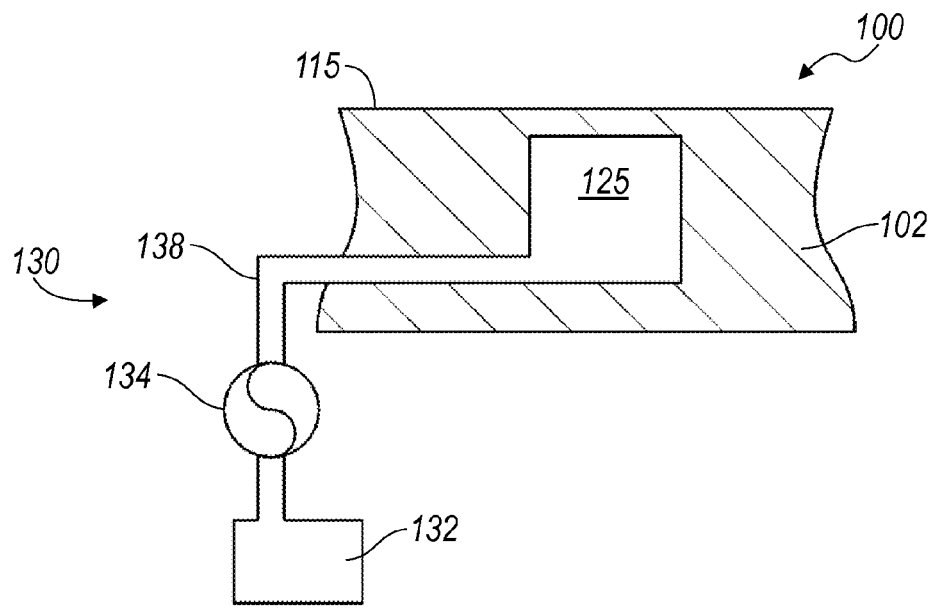
FIG. 8 is a schematic view of the sheet, the cavity, and a displacement device of a first example of the first preferred embodiment that displaces additional fluid into the cavity.
Figure 9:
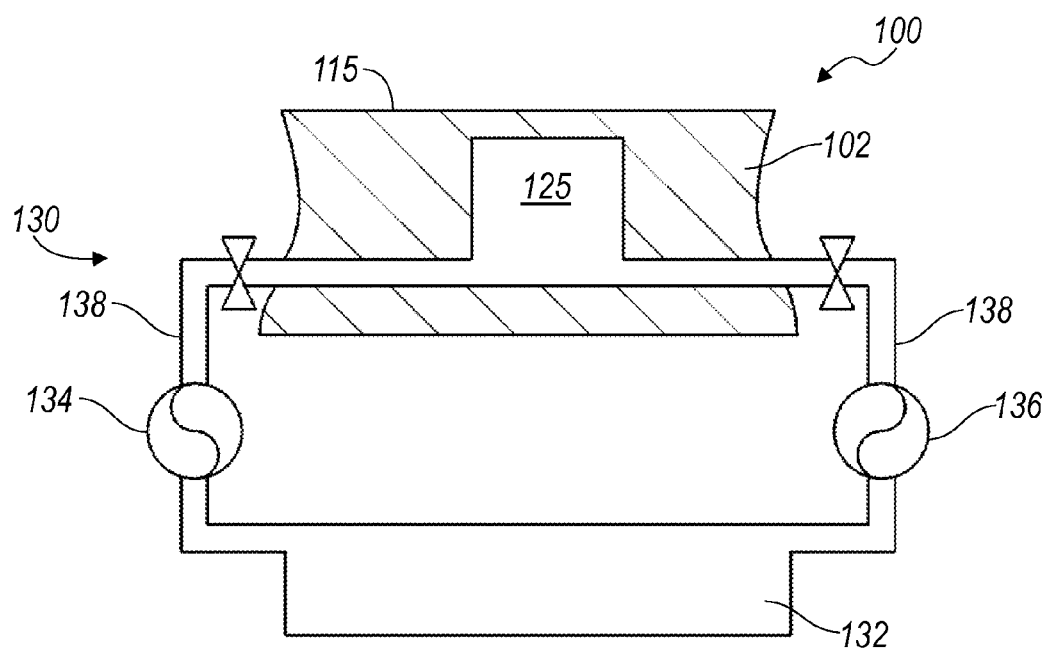
FIG. 9 is a schematic view of the sheet, the cavity, and a displacement device of a second example of the first preferred embodiment that displaces additional fluid into the cavity.
Figure 10A:
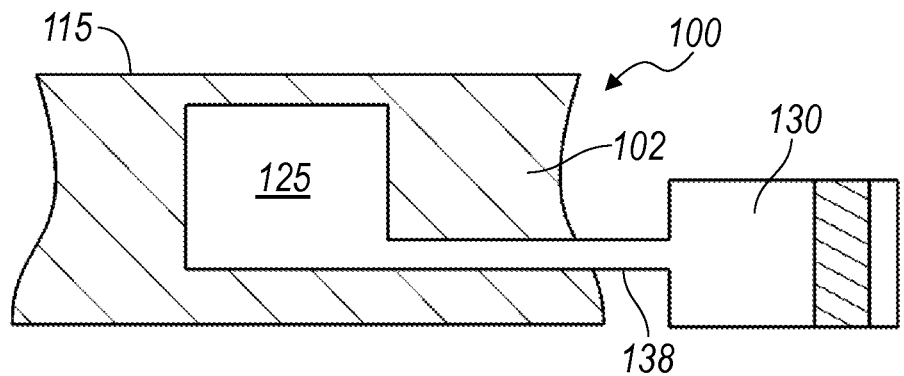
FIGS. 10a and 10b are schematic views of the sheet, the cavity, and a displacement device of a third example of the first preferred embodiment that displaces additional fluid into and out of the cavity, with the cavity in a retracted volume setting and an expanded volume setting, respectively.
Figure 10B:
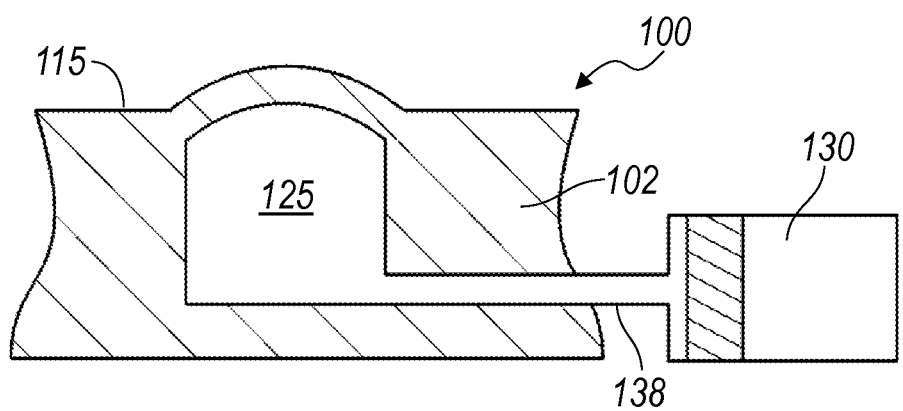

Displacing fluid to and from the cavity 125 may also be accomplished in several ways. In a first example, as shown in FIG. 8, the displacement device 130 includes a reservoir 132 to hold additional fluid and a pump 134 to displace fluid from the reservoir 132 to the cavity 125. The reservoir 132 is preferably rigid, but may alternatively be pliable, for example, the reservoir 132 may be collapsible to decrease in volume when the volume of fluid 112 within decreases. The reservoir 132 is preferably remote from the cavity 125 (and connected by a channel 138 or other suitable connection device), but may alternatively be located adjacent the cavity 125 and connected directly to the cavity 125. A portion of the channel 138 is preferably a micro-fluidic channel (having cross-section dimensions in the range of 1 micrometer to 1000 micrometers), but depending on the size and costs constraints of the user interface enhancement system 100, the channel 138 may have any suitable dimensions. The pump 134 is preferably a micro-pump (such as pump #MDP2205 from ThinXXS Microtechnology AG of Zweibrucken, Germany or pump #mp5 from Bartels Mikrotechnik GmbH of Dortmund, Germany). The pump 134 may alternatively be an electroosmotic flow pump, but may be any suitable device to pump fluid from one location to another. The pump 134 is preferably located at a distance from the cavity 125, and is preferably connected to the cavity 125 by a channel 138. To expand the cavity 125 from a retracted volume setting to the expanded volume setting, the pump 134 displaces fluid from a reservoir 132, through the channel 138, and into the cavity 125. To retract the cavity 125 from the expanded volume setting to the retracted volume setting, the pump 134 preferably "vents" or pumps in a reverse direction from the cavity 125 to the reservoir 132. In a second example, as shown in FIG. 9, the displacement device 130 includes a reservoir 132 substantially similar or identical to the reservoir described in the first example that holds additional fluid 112, a first pump 134 to displace fluid from the reservoir 132 to the cavity 125, a second pump 136 to displace fluid from the cavity 125 to the reservoir 132, a first valve located between the first pump 134 and the cavity 125, and a second valve located between the cavity 125 and the second pump 136. To expand the cavity 125 from the retracted volume setting to the expanded volume setting, the first valve is opened, the second valve is closed, and the first pump 134 displaces fluid from the reservoir 132, through the channel 138, and into the cavity 125. To retract the cavity 125 from the expanded position to the retracted position, the first valve is closed, the second valve is opened, and the second pump 136 displaces fluid from the cavity 125, through the channel 138, and into the reservoir 132. Alternatively, the first and second pumps 134 and 136 may function to direct fluid flow without the assistance of valves. For example, first and second pumps 134 and 136 may prevent fluid flow when off. Thus, to expand the cavity 125, the second pump 136 may be turned off while the first pump 134 may be turned on, increasing the volume of fluid within the cavity 125. To retract the cavity 125, the second pump 136 may be turned on and the first pump 134 may be turned off, decreasing the volume of fluid within the cavity 125. In other respects, the second example is similar to the first example above. The user interface enhancement system 100 may omit the second pump 136 and simply retract the cavity 125 from the expanded volume setting to the retracted volume setting by opening the second valve and allowing the cavity 125 to vent or "drain" into the reservoir 132 (potentially assisted by the elasticity of the sheet 102 returning to an un-deformed state). In a third example, as shown in FIGS. 10a and 10b, the displacement device 130 includes an actuator, such as a linear actuator, that displaces fluid into and out of the cavity 125. To expand the cavity 125 from a retracted volume setting to the expanded volume setting, as shown in FIG. 10a, the linear actuator displaces fluid through the channel 138 and into the cavity 125. To retract the cavity 125 from the expanded volume setting to the retracted volume setting, as shown in FIG. 10b, the linear actuator draws fluid in a reverse direction from the cavity 125 to the reservoir 132. In other respects, the third example is similar to the second example above. In a fourth example, the displacement device 130 may include a reservoir 132 that is pressurized and a valve that allows fluid to flow from the pressurized reservoir 132 into the cavity 125. The displacement device 130 of this fourth example preferably also includes a pump 134 that overcomes the pressure within the reservoir 132 to pump fluid from the cavity 125 back into the reservoir 132 to retract the cavity 125. In a fifth example, the displacement device 130 may include a compressible reservoir that is fluidly coupled to the cavity 125 and a motor that moves a paddle to compress and decompress the reservoir, displacing fluid to and from the cavity 125. Alternatively, the displacement device may include a reservoir with a plunger that displaces fluid to and from the cavity 125 and a motor that moves the plunger. While these are five examples, the displacement device 130 can be any other suitable device 10 or method that ultimately expands the cavity 125 from the retracted volume setting to the expanded volume setting by adding and removing fluid to and from the cavity 125.

The user interface system 100 of the first preferred embodiment preferably includes a native power source 200, as shown in FIG. 2, that provides power to the displacement device 130, allowing the user interface system 100 to operate as a standalone unit from the device 10. The native power source 200 is preferably of a substantially small volume and is preferably portable, such as a small disk battery, allowing the native power source 200 to be substantially hidden within the user interface enhancement system 100 and allowing the user interface enhancement system 100 to function portably and wirelessly. The native power source 200 may also be of a rechargeable portable power type, such as a lithium-ion battery cell, nickel-metal-hydride, or any other suitable type of rechargeable battery type. The rechargeable native power source 200 may be coupled to the device 10 through the connector 210 to be recharged using the power from the device 10, but may alternatively be coupled to a wall outlet, a USB power source, an induction charger, or any other suitable power source to be recharged. However, the native power source 200 may be of any other suitable type. Alternatively, the user interface system 100 of the second preferred embodiment may electrically couple to the device 10 through the connector 210 and the power from the device 10 may be used to power the displacement device 130. Similarly, the power provided by the device 10 may be used for any other suitable purpose in the user interface enhancement system 100. However, the power source of the user interface system 100 of the second preferred embodiment may be any other suitable electrical power source.

2. Second Preferred Embodiment

Manually Powered

Figure 15A:
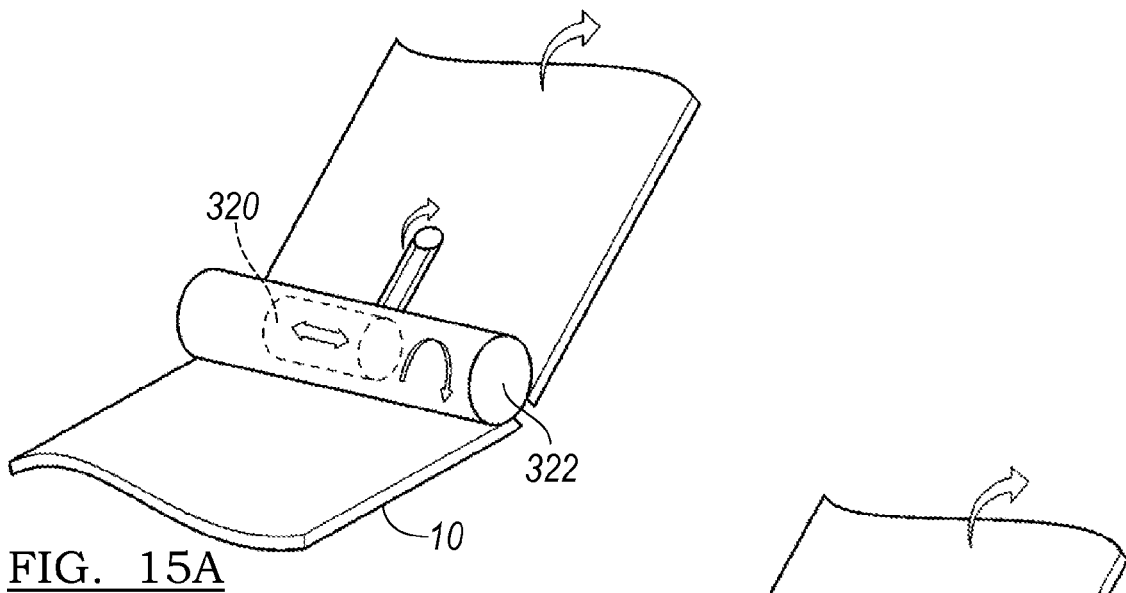
Figure 15B:
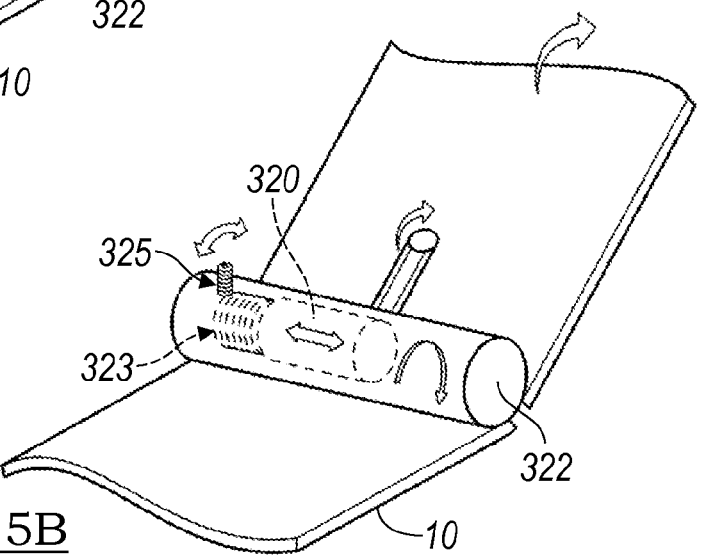

The displacement device 130 of the second preferred embodiment is preferably manually powered, which may allow the user interface enhancement system 100 to rely on relatively simple mechanics. The actuation of the displacement device 130 of the second preferred embodiment also preferably powers the displacement device 130 Alternatively, the actuation of the displacement device 130 may be decoupled from the power of the displacement device 130. For example, power provided by the user to the displacement device 130 may be stored until the user actuates the displacement device 130 by releasing the stored power. In a more specific example, the displacement device 130 may include an accumulator 323, as shown in FIG. 15b, and power provided by a user may be used to pressurize fluid within the accumulator 323. The user may then actuate the displacement device 130 by opening a valve 325 from the accumulator 323 that then allows the fluid to expand a cavity 125. The user may provide power directly into the accumulator 323; for example, the accumulator 323 may function as a reservoir to contain a volume of fluid and the user provides a force to increase the pressure within the accumulator 323. Alternatively, the user may provide power to push fluid from a reservoir into a pressurized accumulator. However, any other suitable arrangement of the accumulator may be used. However, any other suitable arrangement of the power and actuation of the displacement device 130 may be used. The following examples are described as actuation of the displacement device 130 also powering the device 130, but a person skilled in the art will understand that the actuation of the following examples of the displacement device 130 may be decoupled from the power of the displacement device 130.

The manual power is preferably provided by the user directly (for example, directly onto the user interface enhancement system 100) or indirectly (for example, indirectly to the user interface enhancement system 100 through the device), but may alternatively be any other suitable manual power. The following examples are described as expanding a fluid vessel 127 that includes a cavity 125 and a channel 138, but the fluid vessel 127 may be any other suitable combination of combination of cavity 125 and channel 138.

Figures 11A, 11B:
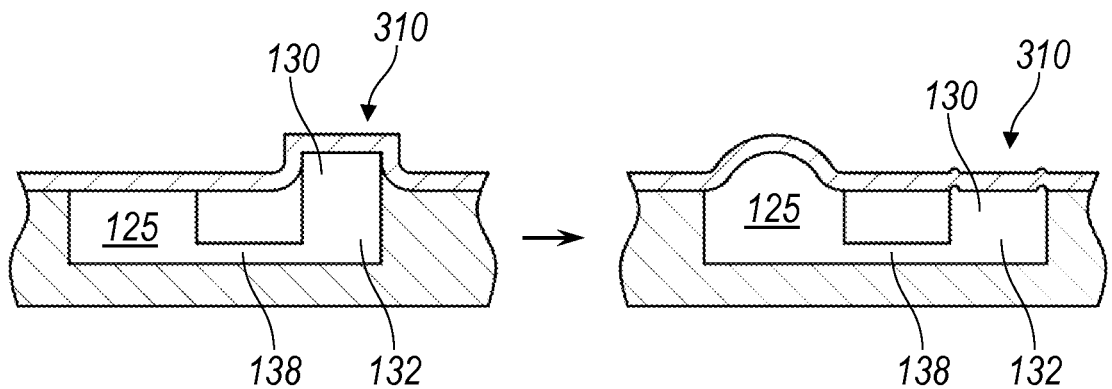
FIGS. 11a, 11b, 12a, and 12b are schematic views of the displacement device of a first and second example of a first variation of the second preferred embodiment.
Figures 12A, 12B:
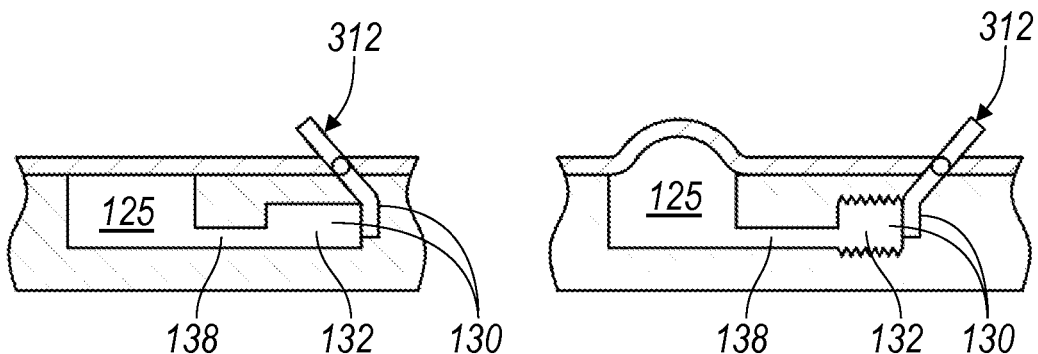

The displacement device 130 of the second preferred embodiment is preferably one of several variations. The manually powered displacement device 130 preferably includes a reservoir 132 that contains a volume of fluid 112 and is fluidly coupled to the cavity 125 through a channel 138 and fluid 112 is preferably displaced between the reservoir 132 and the cavity 125 through manipulation of the reservoir 132. In a first variation, the reservoir 132 is compressed to displace fluid into the cavity 125. Because the reservoir 132 is gradually compressed, the amount of expansion of the cavity 125 may be tuned to any state along the compression of the reservoir 132, which may provide the advantage of a relatively high degree of personalization of the deformation of the particular region 113. Alternatively, the reservoir 132 may be compressed to a first state and a second state, providing two stages of expansion of the cavity 125. In an example of the first variation, the reservoir 132 functions as a button 310 that is accessible to the user, as shown in FIGS. 11a and 11b. When actuated, the button 310 is compressed to move fluid into the cavity 125, similar to a hand-squeezed air pump. In another example of the first variation, the displacement device 130 may include a slider 312 that functions as a paddle to "squeeze" the reservoir 132 to push the fluid from the reservoir 132 to the cavity 125, as shown in FIGS. 12a and 12b. However, any other suitable compression of any other type of reservoir may be used.

Figures 13A, 13B:
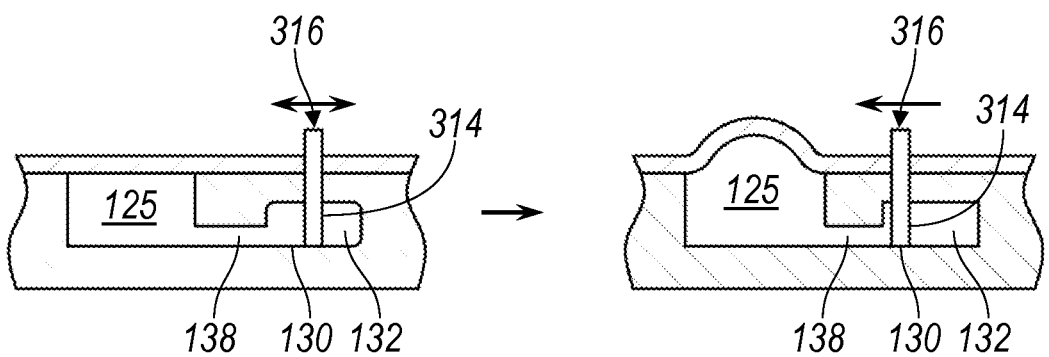
FIGS. 13a and 13b are schematic views of the displacement device of a second variation of the second preferred embodiment.

In a second variation, the displacement device 130 may include a plunger 314 contained within the reservoir 132 that is manually moved relative to the fluid to displace fluid between the reservoir 132 and the cavity 125. In an example of the second variation, the plunger 314 may include a lever 316 that is accessible to the user and the user may push the lever 316 to displace fluid 112 between the reservoir 132 and the cavity 125, as shown in FIGS. 13a and 13b. Similar to the first variation, this allows for a high degree of personalization of the deformation of the particular region 113. However, the displacement device may include any other suitable tangible element that allows the user to create a pumping force to add fluid into the cavity 125.

In a third variation, the displacement device 130 may be coupled to a portion of the device 10 such that movement of the portion of the device actuates and powers the displacement device 130 to displace fluid from the reservoir 132 to the cavity 125. The portion of the device that is coupled to the displacement device 130 may be one that the user provides a force to during normal use of the device 10. There are at least two examples: (1) when the user interface enhancement system 100 is applied to mobile device 10 with a flip cover and a hinge, the power provided by the user to flip open the cover is used to pump the fluid into the cavity 125, and (2) the device may include a button that the user pushes to turn on the device 10.

Figure 14:
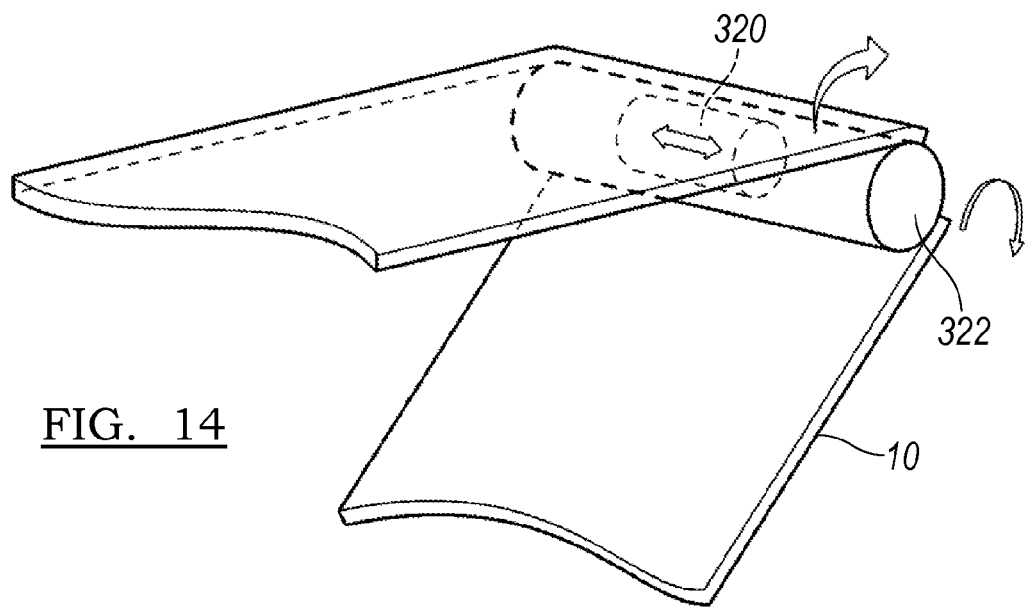
FIGS. 14, 15a, and 15b are schematic views of the displacement device of a first version of a first example of the third variation of the second preferred embodiment and a second version of a first example of the third variation of the second preferred embodiment, with and without an accumulator, respectively.

In a first example of the third variation, when the user interface enhancement system 100 is applied to mobile device 10 with a flip cover and a hinge, the power provided by the user to flip open the cover is used to pump the fluid into the cavity 125. The reservoir 132 is a channel reservoir 322 and the displacement device 130 includes a piston 320 contained within the channel reservoir 322. The displacement device 130 is preferably incorporated into the hinge of the device. A first set of threads on the piston 320 and a second set of threads on the channel reservoir 322 forms the interface in between the piston 320 and the channel reservoir 322. The hinge of the flip cover of the device 10 may be coupled to the channel reservoir 322 such that as the flip cover is opened, the channel reservoir 322 is also rotated while the piston 320 is anchored to prevent rotation but allow translation along the channel reservoir 322 (as shown in FIG. 14). As the channel reservoir 322 is rotated, the mating threads cause the piston 320 to rotate within the channel reservoir 322, thus pumping the fluid to the cavity 125. Alternatively, the hinge of the flip cover of the device 10 may be coupled to the piston 320 such that as the flip cover is opened, the piston 320 is rotated while allowing translation along the channel reservoir 322 due to the mating threads, thus pumping the fluid into the cavity 125 (as shown in FIGS. 15*a* and 15B). The hinge of the flip cover of the device 10 may alternatively be coupled to the piston 320 such that as the flip cover is opened, the piston 320 is rotated but remains stationary lengthwise along the axis of rotation, causing the channel reservoir 322 to move relative to the piston 320 and pumping the fluid into the cavity 125.

Figure 16:
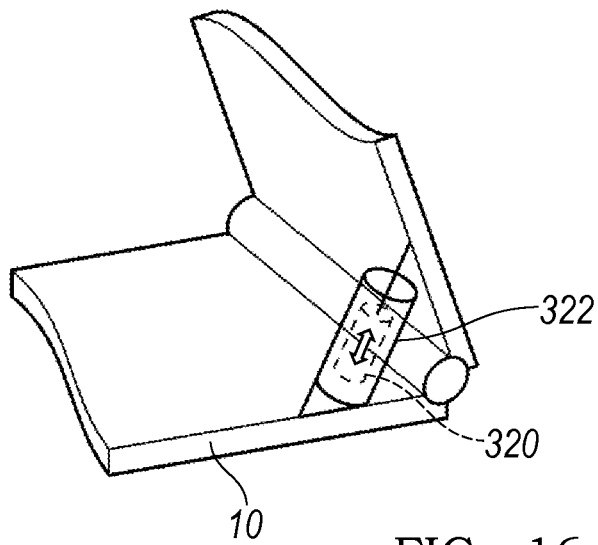
FIG. 16 is a schematic view of the displacement device of a second version of the first example of the third variation of the second preferred embodiment.
Figure 17A:
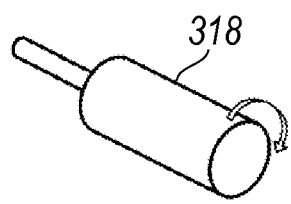
FIGS. 17a, 17b, 18a, and 18b are schematic views of the displacement device of a third version of the first example of the third variation of the second preferred embodiment.
Figure 17B:
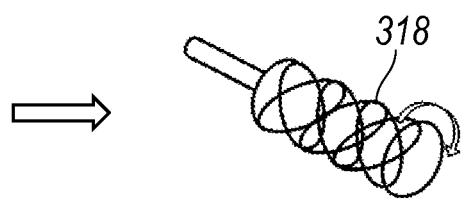
Figure 18A:
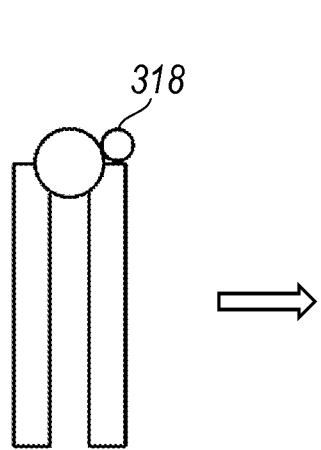
Figure 18B:
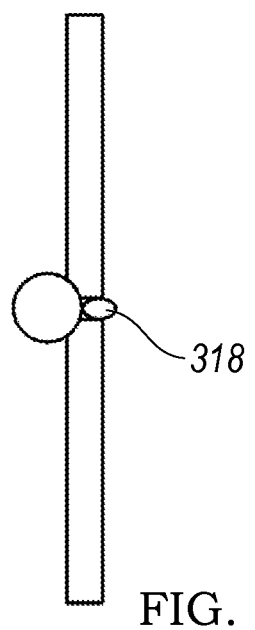

The displacement device 130 may alternatively be coupled to the flip cover of the device. The piston 320 and the channel reservoir 322, function to slide relative to each other. The piston 320 may be coupled to the flip cover while the channel reservoir 322 is coupled to the rest of the device. As the flip cover is opened, the piston translates within the channel reservoir 322 and the fluid is pumped to the cavity 125 (as shown in FIG. 16). Alternatively, the channel reservoir 322 may be translated relative to the piston as the flip cover is opened. However, any other orientation of the pump and the channel reservoir 322 suitable to pumping the fluid into the cavity 125 may be used.

Another version of the first example is substantially similar to the first variation of the second preferred embodiment where the displacement device 130 includes a reservoir 132 that is compressed to displace fluid 112 into the cavity 125. The reservoir 132 is preferably a pliable cavity 318 that is coupled to the flip cover of the device, wherein the opening of the flip cover functions to squeeze or twist the pliable cavity 318 (as shown in FIGS. 17*a*, 17*b*, 18*a*, and 18*b*) to pump the fluid into the cavity 125. However, any other device 10 or method suitable to utilizing the energy from flipping open a flip cover of a device 10 may be used.

In a second example of the third variation, the device 10 may include a slider that covers a portion of the device that is moved to reveal the portion of the device, for example, a slider that hides a keyboard of a mobile phone and is slid to reveal a keyboard or a slider that protects a lens of a camera and is slid to reveal the lens and/or turn on the device 10. The sliding motion may be used to actuate and/or power the displacement device 130. For example, the slider of the device 10 may be coupled to the slider 312 or the lever 316 of the first and second variation of the second preferred embodiment and the motion of the slider of the device 10 may actuate the slider 312 or the lever 316 to compress the reservoir 132 to expand the cavity 125.

In a third example of the third variation, the device 10 may include a button, for example, a button that the user pushes to turn on the device 10. The pushing force used to turn on the device 10 may be coupled to the displacement device 130 and used to pump the fluid into the cavity 125. The displacement device 130 of this example may be a button similar to button 310 described in the first example of the first variation of the second preferred embodiment as described above, wherein the button is coupled to the button of the device 10 and is concurrently actuated with the button of the device 10. However, any other suitable device or method to harness the power provided by the user in the normal operation of the device 10 and transfer the power to actuate the expansion of the cavity 125 may be used.

In a fourth variation, the cavity 125 may be biased into either a retracted or an expanded state. For example, the cavity 125 may be biased into an expanded state until the user performs an action to switch the cavity 125 into the retracted state. The actuation of the retracted state may be performed using a method and system similar or identical to those described in the first and second examples of the first variation of the second preferred embodiment for the actuation of the expanded state of the cavity 125. In a first example, the button 310 of the first example of the first variation described above may be biased to expand the cavity 125. The button 310 of this example may include a lever arm that, when pushed, functions to counteract the bias of the button 310. The lever arm is preferably in contact with the flip cover such that when the flip cover is returned to the closed state, the bias of the flip cover to remain closed is used to push against the lever arm, thus counteracting the bias of the button 310 and returning the cavity 125 into the retracted state. In a second example, the piston 320 and channel reservoir 322 of the third variation described above may be biased by a spring into maintaining the expanded mode of the cavity 125. When the user closes the flip cover of the device 10, the piston 320 is translated within 322 such that the biasing force of the spring is overcome and the cavity 125 is retracted. This variation may alternatively be described as a user inputting energy into an energy storage mechanism to be used for a future actuation of the expansion of the cavity 125. For example, a user may compress a compression spring, extend a tension spring, or twist a torsion spring, and then select to use the stored energy to actuate the expansion of the cavity 125. In the variation that includes a second cavity 125*b*, the user preferably chooses the cavity 125 or second cavity 125*b* to be expanded with the stored energy. For example, a reservoir may be fluidly coupled to both the cavity 125 and the second cavity 125 through a Y-junction that includes a valve. The valve may include a mechanical switch that directs fluid to one of (or both of) the cavity 125 and second cavity 125*b*. The user may actuate the switch to expand the desired cavity (or cavities). The user interface enhancement system 100 preferably also includes an energy storage facilitator that allows the user to more easily store energy into the energy storage mechanism. The facilitator preferably provides the user with mechanical leverage (for example, a lever), but may alternatively be of any other suitable type. However, any other suitable system or method suitable to bias the cavity 125 into the expanded state until a power input is received from the user may be used.

In the variation wherein the user interface enhancement system 100 includes a second cavity 125*b*, the second cavity 125*b* may be expanded independently of the cavity 125. Alternatively, the cavities 125 and 125*b* may be expanded concurrently. However, any other suitable cavity expansion combination may be used. In the first example of the first variation of the second preferred embodiment, the user interface enhancement system 100 may include a second button 310 that functions as a second displacement device 130 to move fluid into the second cavity 125*b*. In the second example of the first variation where the displacement device 130 includes a slider 312 that actuates a paddle to "squeeze" a reservoir 132, the displacement device 130 may include a second reservoir 132 and the slider 312 may be moved in one direction to "squeeze" a first reservoir 132 to expand the cavity 125 and the slider 312 may then be moved in a second direction to "squeeze" the second reservoir 132 to expand the second cavity 125*b*. The displacement device 130 may alternatively include a second slider 312 to squeeze the second reservoir 132 to actuate the expansion of the second cavity 125*b*. In the second variation of the second preferred embodiment that includes a plunger with a lever, the lever may be shifted to one side to actuate the expansion of the cavity 125 and to another side to actuate the expansion of the second cavity 125*b*, similar to the system and method shown in FIGS. 10*a* and 10*b*. The displacement device 130 may alternatively include a second reservoir and a second plunger contained within the second reservoir with a second lever to actuate the expansion of the second cavity 125*b*.

In the third variation, where the displacement device 130 may be coupled to a portion of the device 10, the channel reservoir 322 may include a second set of threads that cause the piston 320 to translate in a second direction relative to the channel reservoir 322 to pump fluid into the second cavity 125b. Alternatively, the displacement device 130 may include a second channel reservoir 322 and a second piston 320 that function to pump fluid into the second cavity 125b. In the third variation, the user interface enhancement system 100 preferably includes a selector that allows the user to select one or both of the cavities 125 and 125b. The selector may be a temporary coupler that functions to couple the desired channel reservoir 322 or piston 32o to the rotation movement of the flip cover, but may alternatively be any other suitable selector system or method. The selector is preferably accessible to the user prior to the action used to actuate the expansion of the cavity 125. For example, in the example wherein force used in the opening of the flip cover is used to actuate the expansion (or retraction) of the cavity 125, the user is preferably able to select the cavity they wish to expand (for example, through a selector button on the exterior of the device 10) prior to opening the flip cover such that the correct cavity is expanded upon opening of the flip cover. This allows for the user to have immediate tactile guidance once the device 10 is turned on and accessible. Alternatively, the user may select the cavity after the device 10 has been turned on and accessible. In this variation, one of the cavities will already be expanded and the selector functions to switch the expansion over to the other cavity or to both cavities. In the variation wherein the hinge is coupled to the piston 320, the selector may function to allow the user to translate the piston 320 in a second direction to expand the second cavity 125b. The selector may also allow for a combination of the two variations mentioned here. The selector may alternatively also be used to adjust the level of expansion of the cavity 125. However, any other suitable system or method may be used for the expansion of the second cavity 125b.

In the first, second, and third variations of the second preferred embodiment, once the cavity 125 is expanded, the cavity 125 is preferably held in the expanded state without further force provided by the user. Because of the force that may be necessary to push against the walls of the cavity 125 to expand the cavity 125, the fluid may be naturally biased to flow backwards and allow the cavity 125 to return to the retracted state. In the first example of the first variation, the button 310 may include a locking mechanism 315 to lock the button 310 into the actuated state to prevent the fluid from moving back into the button 310 and away from the cavity 125, as shown in FIGS. 19 and 20. To return the cavity 125 into the retracted state, the user preferably disengages the locking mechanism 315. In the variation wherein the button 310 is a push button, the locking mechanism 315 may include a sliding tab 317 that engages with the top of the button 310 to keep the button 310 in the actuated state, as shown in FIGS. 19a and 19b. In the variation that includes a slider 312, the locking mechanism 315 may be an engager 317 that engages the slider when the cavity 125 is expanded, as shown in FIGS. 20a and 20b. The engager 317 may be a hook that engages with a hole or a ledge in the slider, a peg that engages with the slider, or a clamp that engages with the slider, or any other suitable type of engagement geometry. The engager 317 may also include a spring to facilitate the engagement of the slider. However, the locking mechanism 315 may be of any other suitable method or system. In the second version, because the devices that have a flip cover generally have a biasing spring such as a torsional spring to keep the flip cover in the open position, the user interface enhancement system 100 preferably utilizes this biasing force to maintain the expanded state of the cavity 125. However, any other system or method suitable to maintain the expanded state of the cavity 125 without further power input from the user may be used.

3. Actuation of the Expansion of the Cavity

The displacement device 130 of both preferred embodiments may be actuated by the device, but may alternatively be actuated by the user. In the variation where the displacement device 130 is actuated by the device, the user interface enhancement system 100 functions to communicate with the device 10 and the device 10 functions to actuate the expansion of the cavity 125. In this preferred embodiment, the device 10 actuates the expansion of the cavity 125 whenever the device 10 determines that tactile guidance is to be provided to the user. The device 10 may alternatively actuate the expansion of the cavity 125 when the user inputs into the device 10 that tactile guidance is desired. The device 10 also preferably determines the length of time the cavity 125 is to be expanded, the rate of expansion of the cavity 125, the level of expansion of the cavity 125, and/or any other characteristic of the expansion of the cavity 125 that may affect the tactile guidance provided to the user may be controlled by the device 10. In the variation wherein the user interface enhancement system 100 includes a second cavity 125b, the device 10 may also function to selectively actuate the expansion of one of or both of the cavity 125 and the second cavity 125b. The selection of the cavity or cavities to be expanded may depend on whether tactile guidance is to be provided to the user at the location of the corresponding particular regions 113. However, any other factors suitable to determining the actuation of the expansion of the cavity 125 and/or the second cavity 125b may be used.

As shown in FIG. 2, the variation where the device 10 actuates the expansion of the cavity 125 preferably includes a data-link 205 that functions as the communication bus between the device 10 and the user interface enhancement system 100. The data-link 205 may include a wire that interfaces to an I/O port of the device 10 through a connector 210 or any other suitable wired connection, but may alternatively include a wireless transmitter and/or receiver that establishes a wireless connection with the device 10 using a protocol such as Bluetooth, ZigBee, WiFi, or any other suitable wireless protocol. However, the data-link 205 may be of any other suitable type that allows the user interface enhancement system 100 to communicate with device 10 to result in the actuation of the expansion or retraction of the cavity 125 at the desired time. The user interface enhancement system 100 may also include a processor (not shown) that communicates with the device 10 and relays instructions received from the device 10 to the displacement device 130 to expand the cavity 125. The user interface enhancement system 100 may also transmit data to the device 10 that indicates the state of the cavity 125, the power remaining in the native power source 200, and/or any other data suitable to indicate the state of the user interface enhancement system 100. However, any other suitable communication arrangement between the user interface enhancement system 100 and the device 10 may be used. In the first preferred embodiment, the data-link 205 may also function to allow power from the device 10 to transfer to the user interface system 100.

Alternatively, the user may actuate the displacement device 130. By allowing the user to actuate the expansion of the cavity 125, a data-link 205 is not necessary as in the variation where the device 10 actuates the displacement device 130 because communication between the user interface enhancement system 100 and the device 10 is not required for operation of the user interface enhancement system 100. Because electronic devices from different manufacturers generally have different criteria for communication, removing the need to communicate with the device 10 upon which the user interface enhancement system 100 is appended may allow the user interface enhancement system 100 of the second preferred embodiment to be applicable to a wider variety of electronic device with substantially little development time. In general, to adapt the user actuated variation of the user interface enhancement system 100 to different electronic devices, relatively simple changes in the placement of the cavity 125, the geometry of cavity 125, the overall size of the user interface enhancement system 100, and the number of cavities 125 and 125b may be made.

Because of the manually powered nature of the second preferred embodiment, the displacement device 130 of the second preferred embodiment is preferably user actuated. The displacement device 130 of the first preferred embodiment may also be user actuated. For example, the user interface enhancement system 100 of the first preferred embodiment may include a button (or a switch) that functions to allow the user to activate the expansion of the cavity 125. The button may be a two state button that functions to signal the displacement device 130 to expand the cavity 125 and/or to retract the cavity 125, but may alternatively be a button with more than two states that function to allow the user to select the level of expansion of the cavity 125. The actuation of the button may signal the displacement device 130 to expand the cavity 125 until a second actuation of the button is received, wherein the second actuation of the button signals the displacement device 130 to retract the cavity 125. Alternatively, the actuation of the button may result in the expansion of the cavity 125 until the button is released or returned to an initial state (for example, a slider button that remains in one position until the user moves the slider into a second position). The actuation of the expansion of the cavity 125 may alternatively be of any other suitable sequence. In the variation wherein the user interface enhancement system 100 includes a second cavity 125b, the button may also function to signal to the displacement device 130 to expand the second cavity 125b. For example, the button may be a slider with a first slider position to signal no expansion, a second position to signal expansion of the cavity 125, a third position to signal expansion of the second cavity 125b, and/or a fourth position to signal expansion of both the cavities 125 and 125b. The slider may alternatively include a first slider position to signal no expansion, a second position to signal a first degree of expansion of the cavity 125, and a third position to signal a second degree of expansion of the cavity 125. The slider of this variation may be used to indicate the range of degrees of expansion available with the displacement device 130. Alternatively, the user interface enhancement system 100 may include a second button that functions to signal to the displacement device 130 to expand the second cavity 125b. However, any other suitable user interface may be used to allow the user to selectively expand the cavity 125 and/or the second cavity 125b electrically.

The user preferably actuates the expansion of the cavity 125 when he or she desires tactile guidance, for example, the user may be performing an activity where it is difficult or undesirable to keep their eye on the device 10 (for example, while typing at substantially high-speeds or while driving). In another example, the device 10 may be low on portable power and the display may be dimmed to conserve power, resulting in the lack of visual cues and the need for the alternative of tactile guidance. In such situations, the user actuates the expansion of the cavity 125 to obtain tactile guidance that allows them to use the device 10 without visual guidance. The user may also configure the level of expansion of the cavity 125. The user may also configure the user interface enhancement system 100 to expand the cavity 125 upon activation of the device 10 or they may configure the cavity 125 to remain expanded whether the device 10 is on or off. In the variation wherein the user interface enhancement system 100 includes a second cavity 125b, the user also selects whether to actuate the expansion of the cavity 125 or the second cavity 125b, or both. However, any other suitable usage scenario may be applicable.

As a person skilled in the art will recognize from the previous detailed description and from the figures and claims, modifications and changes can be made to the preferred embodiments of the invention without departing from the scope of this invention defined in the following claims.

We claim:

1. A user interface enhancement system comprising:
a substrate comprising an attachment face and defining a fluid channel;
a tactile layer comprising a tactile surface and a back surface opposite the tactile surface, the back surface connected to the attachment face at a first region of the tactile layer, the tactile layer defining a deformable region over the fluid channel, adjacent the first region, and disconnected from the attachment face;
a volume of fluid;
a reservoir adjacent the substrate, fluidly coupled to the fluid channel, and containing the volume of fluid;
a paddle compressing the reservoir to displace fluid from the reservoir and into the fluid channel to transition the deformable region from a retracted setting to an expanded setting, the deformable region in the expanded setting tactilely distinguishable from the deformable region in the retracted setting;
a housing transiently arranged outside an external surface of a body of a computing device to transiently retain an edge of the substrate over a touch sensitive display of the computing device, the housing cooperating with the substrate to enclose the reservoir and the paddle, the reservoir arranged between the housing and the external surface of the body of the device; and
an actuator supported by the housing, engaging the paddle and displacing the paddle to compress the reservoir in response to manual actuation of the actuator, the paddle comprising a platen and the actuator comprising a slider translationally coupled to the housing, the slider translating the platen relative to the reservoir to compress the reservoir in response to manual actuation of the slider.

2. The user interface enhancement system of claim 1, wherein the paddle displaces fluid away from the back surface of the deformable region to transition the deformable region from the expanded setting to the retracted setting.

3. The user interface enhancement system of claim 1, wherein the substrate comprises a second support member continuous with the attachment face, the substrate further defining a second fluid channel configured to communicate fluid through the second support member, wherein the back surface of the tactile layer is adjacent and disconnected from the second support member at a second deformable region of the tactile layer, wherein the support member resists inward deformation of the second deformable region into the second fluid channel, and wherein the paddle displaces fluid through the second fluid channel to transition the second deformable region between a retracted setting and an expanded setting, the second deformable region tactilely distinguishable from and offset above the first region in the expanded setting and substantially flush with the first region in the retracted setting.

4. The user interface enhancement system of claim 3, wherein the paddle selectively transitions the deformable region and the second deformable region between the retracted setting and the expanded setting.

5. The user interface enhancement system of claim 1, wherein the tactile layer comprises a first sublayer and a second sublayer directly joined across an interface, wherein the first sublayer defines the tactile surface opposite the interface, and wherein the second sublayer defines the back surface opposite the interface.

6. The user interface enhancement system of claim 1, wherein the back surface of the tactile layer is directly connected to the attachment face with an adhesive.

7. The user interface enhancement system of claim 1, wherein the substrate comprises multiple layers, at least one layer of the multiple layers comprising a rigid material.

8. The user interface enhancement system of claim 3, wherein the tactile layer defines a third deformable region operable between a retracted setting and an expanded setting, the third deformable region substantially flush with the first region in the retracted setting, and the third deformable region tactilely distinguishable and offset above the first region in the expanded setting.

9. The user interface enhancement system of claim 8, wherein the substrate defines a second support surface adjacent the third deformable region and resisting inward deformation of the third region into the fluid channel.

10. The user interface enhancement system of claim 9, wherein the paddle manipulates a portion of the reservoir to transition the second deformable region from the retracted setting into the expanded setting independently of the third region.

11. The user interface enhancement system of claim 1, wherein the tactile layer, the substrate, and the volume of fluid are substantially transparent.

12. The user interface enhancement system of claim 1, wherein the volume of fluid comprises a fluid of a refractive index substantially similar a refractive index of the substrate.

13. A user interface enhancement system comprising:
a substrate comprising an attachment face and defining a fluid channel;
a tactile layer comprising a tactile surface and a back surface opposite the tactile surface, the back surface connected to the attachment face at a first region of the tactile layer, the tactile layer defining a deformable region over the fluid channel, adjacent the first region, and disconnected from the attachment face;
a volume of fluid;
a reservoir adjacent the substrate, fluidly coupled to the fluid channel, and containing the volume of fluid;
a paddle compressing the reservoir to displace fluid from the reservoir and into the fluid channel to transition the deformable region from a retracted setting to an expanded setting, the deformable region in the expanded setting tactilely distinguishable from the deformable region in the retracted setting;
a housing transiently arranged outside an external surface of a body of a computing device to transiently retain an edge of the substrate over a touch sensitive display of the computing device, the housing cooperating with the substrate to enclose the reservoir and the saddle the reservoir arranged between the housing and the external surface of the body of the device; and
an actuator supported by the housing, engaging the paddle and displacing the paddle to compress the reservoir in response to manual actuation of the actuator, the actuator hinged to the housing and comprising a cover operable between a first position and a second position, the cover arranged over the tactile surface and withholding the paddle from the reservoir in the first position, and the cover arranged over a back surface of the housing and retaining the paddle against the reservoir in the second position.

14. The user interface enhancement system of claim 13, further comprising a hinge coupling the cover to the housing, the cover rotating about the hinge to actuate the paddle.

15. The user interface enhancement system of claim 13, wherein the substrate defines a support member, the back surface of the tactile layer adjacent and disconnected from the support member at the deformable region, the support member resisting inward deformation of the deformable region past the support member due to a force applied to the tactile surface.

16. The user interface enhancement system of claim 15, wherein the support member resists inward deformation of the deformable region into the fluid channel, past the attachment face due to a force applied to the tactile surface.

17. A user interface enhancement system comprising:
a substrate comprising an attachment face and defining a fluid channel
a tactile layer comprising a tactile surface and a back surface opposite the tactile surface, the back surface connected to the attachment face at a first region of the tactile layer, the tactile layer defining a deformable region adjacent the fluid channel, adjacent the first region, and disconnected from the attachment face;
a reservoir adjacent the substrate, fluidly coupled to the fluid channel, and containing the volume of fluid;
a paddle compressing the reservoir to displace fluid from the reservoir into the fluid channel to transition the deformable region from a retracted setting into an expanded setting, the deformable region in the expanded setting tactilely distinguishable from the deformable region in the retracted setting;
a housing transiently arranged outside an external surface of a body of a computing device to transiently retain an edge of the substrate over a touch sensitive display of the computing device, the housing cooperating with the substrate to enclose the reservoir and the paddle, the reservoir arranged between the housing and the external surface of the body of the device; and
an actuator supported by the housing, engaging the paddle, and displacing the paddle to compress the reservoir in response to manual actuation of the actuator, the paddle comprising a platen and the actuator comprising a slider translationally coupled to the housing, the slider translating the platen relative to the reservoir to compress the reservoir in response to manual actuation of the slider.

* * * * *